US011353259B2

(12) United States Patent
Jeong et al.

(10) Patent No.: US 11,353,259 B2
(45) Date of Patent: Jun. 7, 2022

(54) AUGMENTED-REALITY REFRIGERATOR AND METHOD OF CONTROLLING THEREOF

(71) Applicant: SAMSUNG ELECTRONICS CO., LTD., Suwon-si (KR)

(72) Inventors: Kye Young Jeong, Suwon-si (KR); Minjeong Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 290 days.

(21) Appl. No.: 16/573,445

(22) Filed: Sep. 17, 2019

(65) Prior Publication Data
US 2020/0088463 A1 Mar. 19, 2020

(30) Foreign Application Priority Data

Sep. 18, 2018 (KR) .................. 10-2018-0111257
Feb. 20, 2019 (KR) .................. 10-2019-0019986

(51) Int. Cl.
F25D 29/00 (2006.01)
F25D 23/02 (2006.01)
G06T 19/00 (2011.01)

(52) U.S. Cl.
CPC ......... *F25D 29/005* (2013.01); *F25D 23/028* (2013.01); *G06T 19/006* (2013.01);
(Continued)

(58) Field of Classification Search
CPC .......... F25D 23/028; F25D 29/005; F25D 2400/361; F25D 2500/06; F25D 2700/04; F25D 2700/06; G06T 19/006
See application file for complete search history.

(56) References Cited

U.S. PATENT DOCUMENTS 8,542,906 B1  9/2013 Persson et al.
9,130,999 B2  9/2015 Kim et al.
(Continued)

FOREIGN PATENT DOCUMENTS

CN  107477971 A  12/2017
JP  6282681 B2  2/2018
(Continued)

OTHER PUBLICATIONS

NEWS 1, "If you put the ingredients, the refrigerator comes out to tell you the recipe", Dec. 13, 2016, [retrieved on Nov. 27, 2019], retrieved from the internet: <URL:http://news1.kr/articles/?2855839>. (4 pages total).
(Continued)

*Primary Examiner* — Jonathan Bradford

(74) *Attorney, Agent, or Firm* — Sughrue Mion, PLLC

(57) ABSTRACT

A refrigerator including a main body including a storage room, a door coupled to the main body and rotatable in front of a side of the storage room, and including a display on a front surface of the door, a camera disposed to capture the storage room, and a processor configured to acquire an augmented-reality object corresponding to a food included in an image captured by the camera using a trained artificial intelligence model, to control the display to display the acquired augmented-reality object and the captured image as being overlapped with each other, and based on a user input
(Continued)

being acquired while the acquired augmented-reality object is displayed, to provide a response to the user input based on the acquired augmented-reality object. The refrigerator can utilize an artificial intelligence model trained according to at least one of machine learning, neural network or deep learning algorithm.

22 Claims, 34 Drawing Sheets

(52) U.S. Cl.
CPC .... *F25D 2400/361* (2013.01); *F25D 2500/06* (2013.01); *F25D 2700/04* (2013.01); *F25D 2700/06* (2013.01)

(56) References Cited

U.S. PATENT DOCUMENTS

| | | | |
|---|---|---|---|
| 9,635,159 | B2 | 4/2017 | Baldini et al. |
| 9,639,823 | B2 | 5/2017 | Park et al. |
| 9,928,460 | B1* | 3/2018 | Nowatzyk ............... H04B 1/16 |
| 9,965,798 | B1 | 5/2018 | Vaananen |
| 2012/0122491 | A1 | 5/2012 | Kim et al. |
| 2013/0132987 | A1* | 5/2013 | Narasimhan ....... H04N 21/4532 |
| | | | 725/14 |
| 2015/0161871 | A1 | 6/2015 | Kim |
| 2016/0314622 | A1* | 10/2016 | Davis .................... G06T 7/194 |
| 2017/0039511 | A1 | 2/2017 | Corona et al. |
| 2017/0161950 | A1* | 6/2017 | Seder ................. G02B 27/0179 |
| 2017/0219276 | A1 | 8/2017 | Wang et al. |
| 2018/0059881 | A1* | 3/2018 | Agboatwalla ....... G06F 3/04883 |

FOREIGN PATENT DOCUMENTS

| | | |
|---|---|---|
| KR | 10-2011-0012510 A | 2/2011 |
| KR | 10-1151056 B1 | 6/2012 |
| KR | 10-1162755 B1 | 7/2012 |
| KR | 10-1189867 B1 | 10/2012 |
| KR | 10-2014-0059978 A | 5/2014 |
| KR | 10-1756620 B1 | 7/2017 |
| KR | 10-2018-0024654 A | 3/2018 |
| KR | 10-2018-0025041 A | 3/2018 |
| KR | 10-2018-0030767 A | 3/2018 |
| WO | 2018/128317 A1 | 7/2018 |

OTHER PUBLICATIONS

International Search Report (PCT/ISA/210) dated Dec. 4, 2019 issued by the International Searching Authority in counterpart International Patent Application No. PCT/KR2019/095033.
Written Opinion (PCT/ISA/237) dated Dec. 4, 2019 issued by the International Searching Authority in counterpart International Patent Application No. PCT/KR2019/095033.
Communication dated May 12, 2021 issued by the European Patent Office in European Application No. 19861703.7.
Communication dated Aug. 23, 2021, issued by the European Patent Office in European Application No. 19861703.7.

* cited by examiner

AUGMENTED-REALITY REFRIGERATOR AND METHOD OF CONTROLLING THEREOF

CROSS-REFERENCE TO RELATED APPLICATION

This application is based on and claims priority under 35 U.S.C. § 119 to Korean Patent Application No. 10-2018-0111257, filed on Sep. 18, 2018, and Korean Patent Application No. 10-2019-0019986, filed on Feb. 20, 2019, in the Korean Intellectual Property Office, and the disclosures of which are herein incorporated by reference in their entireties.

BACKGROUND

1. Field

The disclosure relates to a refrigerator and a method of controlling thereof. More particularly, the disclosure relates to a refrigerator capable of providing intuitive and bidirectional information, and a method of controlling thereof.

In addition, the disclosure relates to an artificial intelligence (AI) system utilizing a machine learning algorithm, and an application thereof.

2. Description of Related Art

A refrigerator is an electronic device (or a home appliance) that stores food in a refrigerator section or a freezer section. A refrigerator may store food, medicine, alcoholic liquor, cosmetics, or other consumables.

The advancement of technology has enabled a refrigerator to display an operation mode of the refrigerator on the display, and the refrigerator can display information or acquire a user input by displaying a user interface on the display. Further, in recent years, a refrigerator can communicate with an external device (for example, a server connected to the Internet), and provide additional functionality.

However, through a display included in a related-art refrigerator, only simple text-oriented information is provided, which is monotonous, unintuitive, and provides information in a unidirectional manner.

The above information is presented as background information only to assist with an understanding of the disclosure. No determination has been made, and no assertion is made, as to whether any of the above might be applicable as prior art with regard to the disclosure.

SUMMARY

Aspects of the disclosure address at least the above-mentioned problems and/or disadvantages and provide at least the advantages described below. Accordingly, an aspect of the disclosure is to provide a refrigerator capable of providing intuitive and bidirectional information, and a method of controlling thereof.

In accordance with an aspect of the disclosure, a refrigerator is provided. The refrigerator includes a main body including a storage room, a door coupled to the main body and rotatable in front of a side of the storage room, and including a display on a front surface of the door, a camera disposed to capture the storage room, and a processor configured to acquire an augmented-reality object corresponding to a food included in an image captured by the camera using a trained artificial intelligence model, to control the display to display the acquired augmented-reality object and the captured image as being overlapped with each other, and based on a user input being acquired while the acquired augmented-reality object is displayed, to provide a response to the user input using the acquired augmented-reality object.

In accordance with another aspect of the disclosure, a method of controlling of a refrigerator comprising a main body including a storage room, a door coupled to the main body and rotatable in front of a side of the storage room, and including a display on a front surface of the door, and a camera disposed to capture the storage room is provided. The method includes acquiring an augmented-reality object corresponding to a food included in an image captured by the camera using a trained artificial intelligence model, displaying on the display the acquired augmented-reality object and the captured image as being overlapped with each other, and based on a user input being acquired while the acquired augmented-reality object is displayed, providing a response to the user input using the acquired augmented-reality object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
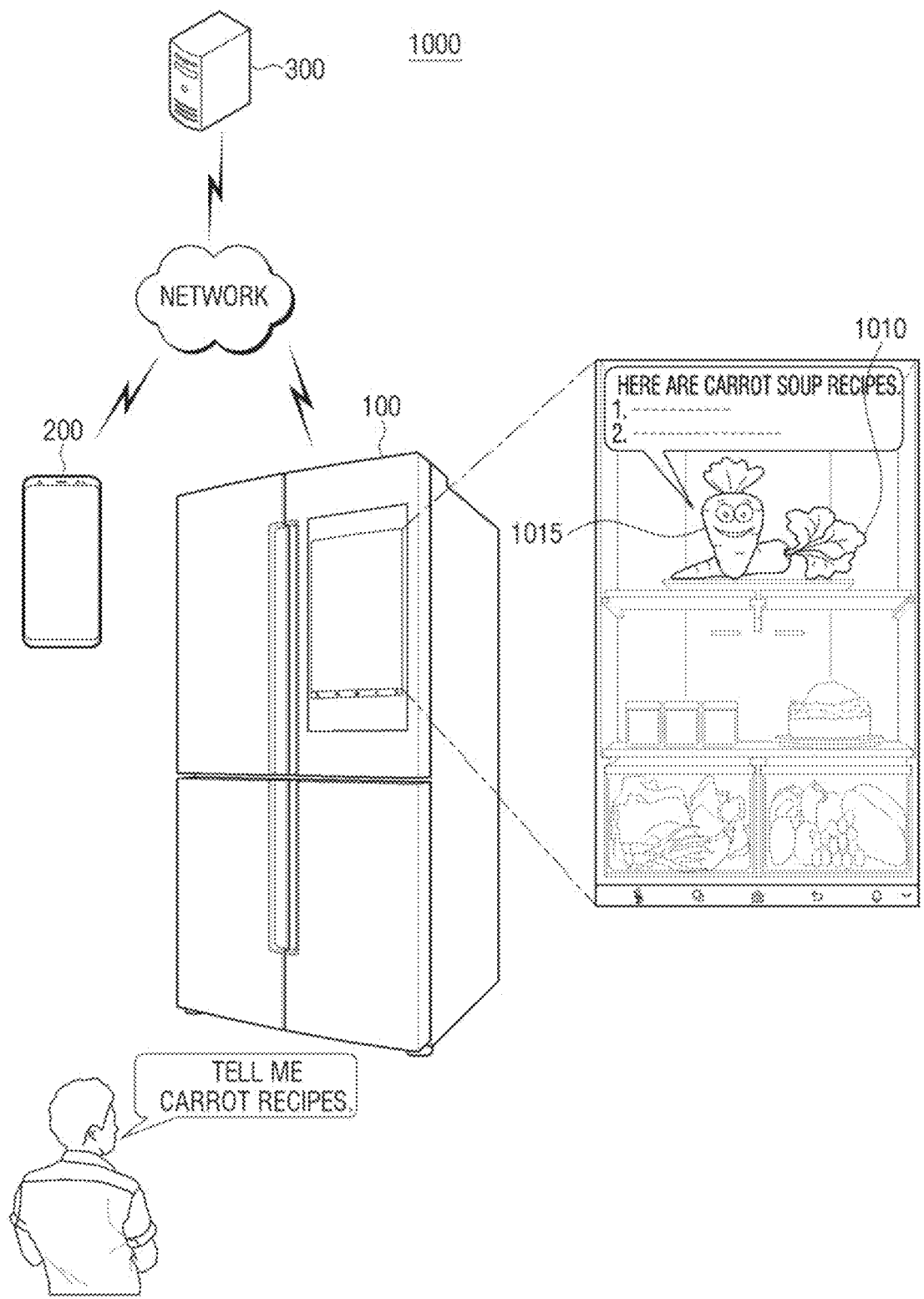
FIG. 1 is a diagram illustrating an example system, according to an embodiment of the disclosure.

Hereinafter, various embodiments of the disclosure will be described with reference to the accompanying drawings. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In the description, the term "has", "may have", "includes" or "may include" indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

If a certain element (e.g., first element) is described as "operatively or communicatively coupled with/to" or is "connected to" another element (e.g., second element), it should be understood that the certain element may be connected to the other element directly or through still another element (e.g., third element). Meanwhile, if one element (e.g., first element) is "directly coupled" with or "directly connected to" another element (e.g., second element), it may be understood that there is no element (e.g., third element) present between the element and the other element.

The expression "configured to (or set to)" used in one or more embodiments of the disclosure may be replaced with "suitable for," "having the capacity to," "designed to," "adapted to," "made to," or "capable of" according to a context. The wording "configured to (set to)" may not necessarily denote or refer to "specifically designed to" in a hardware level. Instead, in certain circumstances, the term "device configured to (do)" may denote that the device is capable of "performing" something with another device or components. For example, the phrase "processor configured (or set) to perform A, B, and C" may denote or refer to a dedicated processor (e.g., embedded processor) for performing the corresponding operations or a generic-purpose processor (e.g., CPU or application processor) that can perform the corresponding operations through execution of one or more software programs stored in a memory device.

According to an embodiment, the application refers to an operation system (OS) for execution by an electronic device or software executed by an electronic device on an operating system to be used by a user. The electronic device may be any computing device, such as a personal computer, a mobile telephone, or mobile device. For example, the application may include a web browser, a camera application, a mobile payment application (or, electronic payment application or payment application), a photo album application, a word processor, a spread sheet, a contacts application, a calendar application, a memo application, an alarm application, a social network system (SNS), a call application, a game store, a game application, a chatting application, a map application, a music player or a video player.

According to an embodiment, an application may refer to software which is executed in an external device (e.g., wearable device, server, and the like) communicatively connected to the refrigerator via wire or wirelessly. According to an embodiment, an application may refer to software which is executed in a refrigerator to correspond to an acquired user input.

Various content may be displayed on the display of a refrigerator. For example, the content may include video files or audio files reproduced by a video player application, game files executed in a game application, music files reproduced by a music player, photo files displayed in a photo album application, web page files displayed by a web browser, or payment information displayed in an electronic payment application (for example, mobile card number, payment amount, product name, service name or store name). In addition, the content may include a call screen displayed in a call application (for example, caller ID, caller name, call start time, or caller video (or caller image) by a video call, etc.).

The content may include a screen of an executed application (or executed widget), and a user interface configuring the application screen. In addition, the content may also include one or more contents.

The widget denotes a light weight application including one or more graphic user interfaces (GUIs) supporting an interaction between a user and an application or an operating system (OS). For example, weather widgets, calculator widgets, clock widgets, etc. may be included.

In an embodiment, 'a user input' may be, for example, a term that includes selection of a button (or a key) by a user, depression (or click) of a button (or a key) by a user, touch of a soft button (or a soft key) by a user, a user touch acquired (or detected) on a touch screen (or a non-contact such as hovering), a user touch gesture acquired (or detected) on a touch screen (or a non-contact such as hovering, a user voice, a user presence (for example, a user appears in a recognition range of a camera) or a user motion. In addition, the 'selection of a button (or a key)' may be a term that denotes depression (or click) of a button (or a key) or touch of a soft button (or a soft key).

The terms used in the description are used to merely describe a specific embodiment, but may not intend to limit the scope of other embodiments. In the disclosure, a singular expression may include a plural expression unless specially described. The terms used herein, including both technical and scientific terms, may have the same meanings as are generally understood by those with ordinary knowledge in the technical field described herein. Among the terms used herein, those that are defined in the dictionaries may be interpreted based on the same or similar definitions that can be understood in the associated technical context, and unless specifically defined otherwise, these are not interpreted as ideal or unnecessarily formal ways. In some cases, even terms defined herein may not be interpreted to exclude the embodiments herein. In describing the drawings, the same reference numerals are used to refer to elements performing substantially the same functions.

FIG. 1 is a diagram illustrating an example system 1000 capable of implementing a technique described herein.

Referring to FIG. 1, the system 1000 may include a server 300 capable of communicating with a plurality of client devices 100 and 200. The server 300 is a device capable of processing various requests acquired from a client device 100. For example, the plurality of client devices 100 and 200 may include a refrigerator 100 and a mobile device 200.

According to an embodiment, the server 300 may include an account server and a service server. The account server may perform authentication of a user. Accordingly, a customized service based on the user may be provided. The service server may perform a function of performing a task regarding a voice inquiry of the user, a function of recognizing food based on an image capturing an inside of the refrigerator 100, etc.

In particular, the server 300 may control the refrigerator 100 or the mobile device 200 to display a composite image for which an augmented-reality object is added to an image capturing an inside of the refrigerator 100, provide an augmented-reality object, and provide a variety of services related to the refrigerator based on (or using) the augmented-reality object.

The augmented-reality object may be referred to as a hologram, and may be a still object or a moving object (animation). The augmented-reality object may be a two-dimensional shape or a three-dimensional shape. The composite image to which the augmented-reality object is added may give the user a feeling as if the augmented-reality object were present in a real world environment. For example, the augmented-reality object may be provided as if placed on the shelf of the refrigerator 100. The augmented-reality object may be a variety of shapes such as a person, an object and the like. For example, as illustrated in FIG. 1, a carrot 1010 actually present inside the refrigerator 100, and a composite image including an augmented-reality object 1015 may be provide on the display of the refrigerator 100.

By this augmented-reality object 1015, various services related to the refrigerator may be provided. For example, as illustrated in FIG. 1, a response to a voice inquiry of the user may be provided through the augmented-reality object 1015.

The server 300 and the plurality of client devices 100 and 200 may communicate with each other via a network. The network may include any one of a number of different types of network such as cellular network, wireless network, local area network (LAN), wide-area network (WAN), personal area network (PAN), Internet and the like, or a combination thereof.

Each of the plurality of client devices 100 and 200 may be connected to an access point such as a wireless router. The plurality of client devices 100 and 200 may be connected to each other wirelessly.

The refrigerator 100 and the mobile device 200 may be interlocked, paired, or synchronized with each other, and provide a common service. Accordingly, information provided on the display of the refrigerator 100 may be provided the same on the display of the mobile device 200.

At least some of the functions of the server 300 may be provided in the refrigerator 100 and the mobile device 200.

For example, the refrigerator 100 and the mobile 200 may perform a function of performing a task regarding a voice inquiry of the user, a function of recognizing food based on an image capturing an inside of the refrigerator 100, etc.

Figure 2:
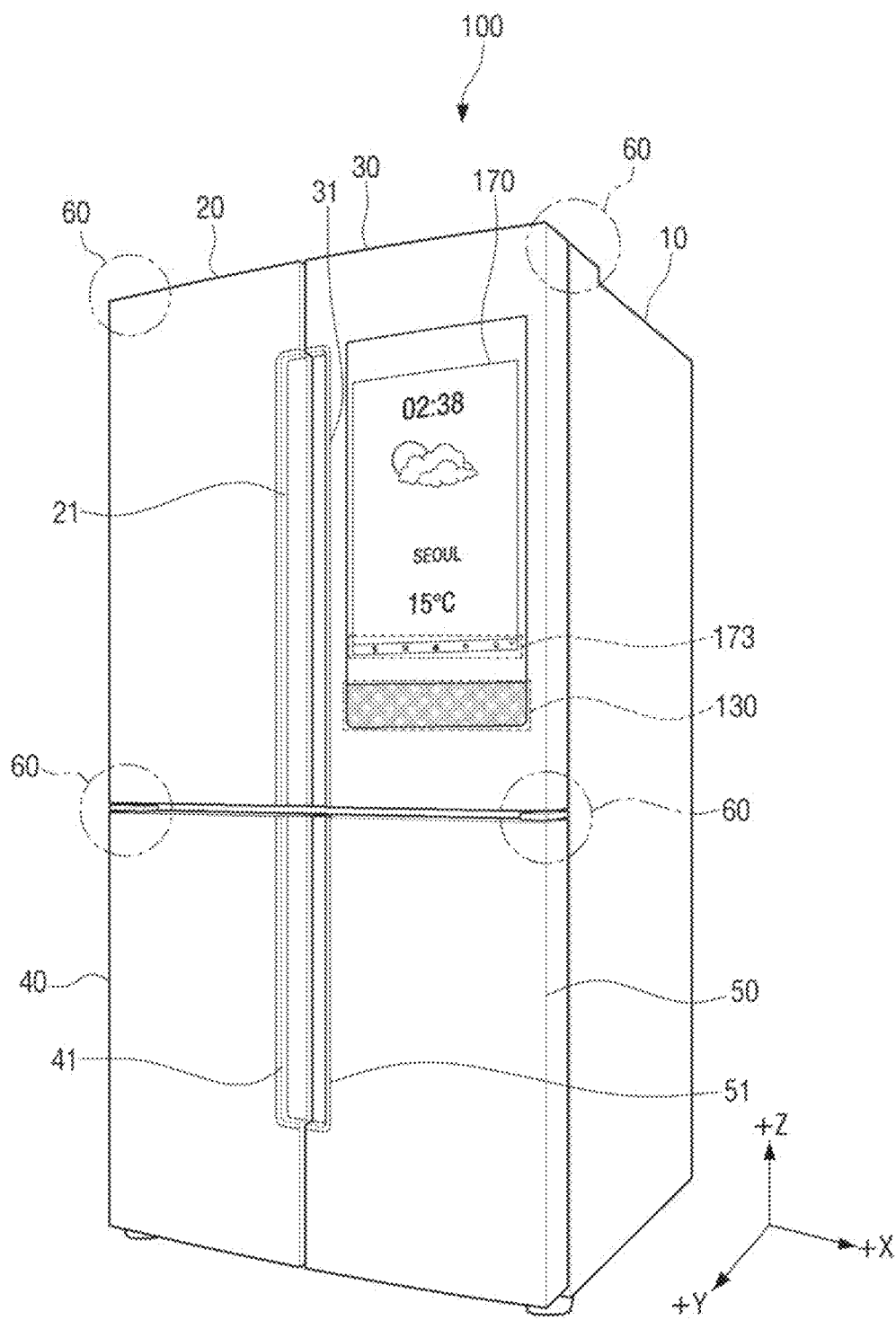
FIG. 2 is a perspective view briefly illustrating a refrigerator, according to an embodiment of the disclosure.

FIG. 2 is a perspective view briefly illustrating a refrigerator, according to an embodiment of the disclosure.

Figure 3:
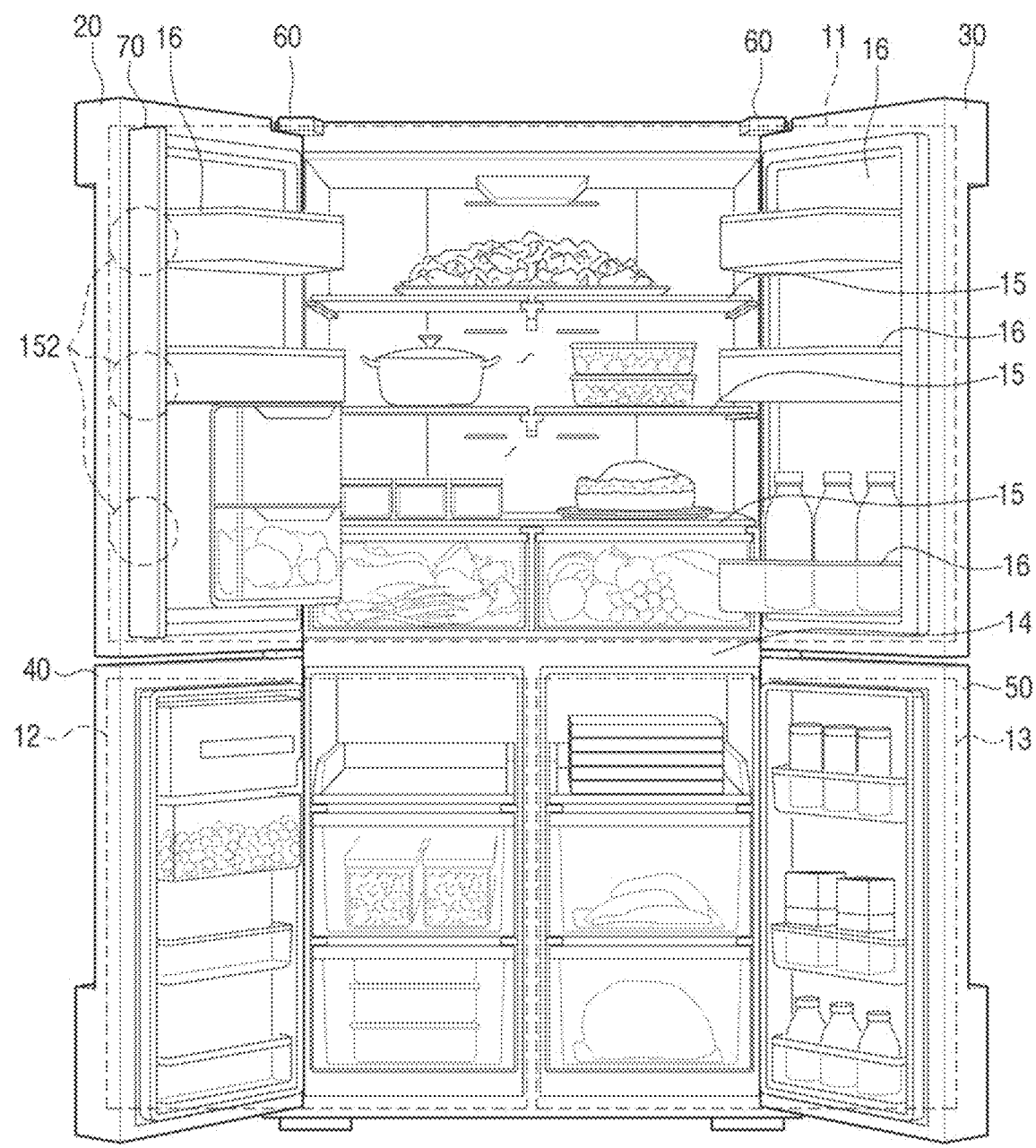
FIG. 3 is a front view briefly illustrating a refrigerator with all doors opened, according to an embodiment of the disclosure.

FIG. 3 is a front view briefly illustrating a refrigerator with all doors opened, according to an embodiment of the disclosure.

Referring to FIGS. 2 and 3, the refrigerator 100 may include a main body 10, a storage room 11, 12 and 13, a plurality of doors 20, 30, 40 and 50, and a hinge 60 connecting the respective doors 20, 30, 40 and 50 to the main body 10. Four doors are merely an example, and the number of doors may be one, two, three, and so on.

A display 170 may be disposed on at least one door from among the plurality of doors 20, 30, 40 and 50 (for example, at least one of a left door 20 or a right door 30). The display 170 may be a touch screen capable of acquiring a touch input.

A speaker 130 may be disposed on at least one door from among the plurality of doors 20, 30, 40 and 50. The speaker 130 may be configured to output audio.

A front camera (or a first camera) 151 (see FIG. 4) may be arranged on at least one door from among the plurality of doors 20, 30, 40 and 50. In addition, a proximity sensor 161 (see FIG. 4) may be disposed on at least one door from among the plurality of doors 20, 30, 40 and 50. In addition, a microphone 140 (see FIG. 4) may be disposed on at least one door from among the plurality of doors 20, 30, 40 and 50.

In addition, a fingerprint sensor 163 (see FIG. 4) may be arranged on at least one door from among the plurality of doors 20, 30, 40 and 50. For example, the fingerprint sensor 163 (see FIG. 4) may be arranged on at least one of a plurality of handles 21, 31, 41 and 51.

The main body 10 may include an inner case included in the storage room 11 to 13, an outer case included in the exterior of the refrigerator, and an insulator maintaining a temperature difference between the inner case and the outer case. The insulator may prevent leakage of the cold air inside the storage room 11 to 13, and prevent inflow of the outside air to the storage room 11 to 13.

The main body 10 may include a cold air supply unit supplying cold air to the storage room 11 to 13. The cold air supply unit may include a compressor 181 compressing a refrigerant (see FIG. 4), a condenser, an expansion valve, an evaporator, and a pipe.

The storage room 11 to 13 may be divided by a partition 14. The storage room 11 to 13 may be divided into a lower freezer storage room 12 and 13 (hereinafter referred to as "a freezer") and an upper cold storage room 11 above the freezer 12 and 13 (hereinafter referred to as "a cold room").

The cold room 11 from among the storage room 11 to 13 divided by the partition 14 may include one or more shelves 15 or one or more storage boxes 16.

The cold room 11 may be coupled to a first door 20 on one side (for example, left side) of the cold room 11, and a second door 30 adjacent to the first door 20 and disposed on the other side (for example, right side) of the storage room 11.

On a front side (for example, +y-axis direction) of the first door 20, a dispenser providing water, ice or sparkling water, and/or a grip handle 21 may be disposed. The second door 30 may include a grip handle 31. The handle 21 of the first door 20 and the handle 31 of the second door 30 may be disposed to be spaced apart toward a left side and a right side with reference to a center area of the cold room 11.

A rotation bar 70 may be rotatably mounted on the first door 20.

The rotation bar 70 may rotatably coupled to the first door 20 so that a gap between the first door 20 and the second door 30 is sealed. The rotation bar 70 may be also applicable to the second door 30.

At least one internal camera (or a second camera) 152 may be arranged on the rotation bar 70. When the rotation bar 70 is at a position where a gap between the first door 20 and the second door 30 is sealed, the internal camera 152 may face the cold room 11. Accordingly, the cold room 11 may be viewed through the internal camera 152 without the first door 20 and second door 30 opened.

On a front surface (for example, +y-axis direction) of the second door 30, a function and stored settings of the refrigerator 100 may be displayed, a user input may be acquired, and a display 170 capable of displaying a screen of an application (or widget) may be disposed. A task bar 173 may be included in the display 170, or may be provided separately from the display 170. The task bar 173 may be a soft button included in a touch screen, or may be a physical button separate from the touch screen. The task bar 173 may include, for example, a microphone key, a menu key, a home key, a back key and a notification key. The microphone may be, when the microphone key is depressed, turned on or off. The menu key may, when depressed, show a menu available on an application being executed, or a program currently being executed. The home key may, when depressed, return to home screen. The back key may, when depressed, return to the previous screen. The notification key may, when depressed, show a list of notifications or turn on or off the Wi-Fi, and control screen brightness, volume, etc.

According to an embodiment, with reference to the display 170, the speaker 130 may be disposed on the lower side of the display 170, and two microphones 140 (see FIG. 4) may be built in the upper left and right of the display 170.

The freezer 12 may include a third door 40 on one side thereof. In addition, the freezer 13 may include a fourth door 50 on one side thereof. The freezer 12 and 13 may be combined into one storage room (for example, as the cold room 11). Like the cold room 11, one freezer may include a door on each of the left and right sides thereof. In this case, the third door 40 or the fourth door 50 may include a rotation bar like the cold room 11, and this rotation bar may include an internal camera arranged to capture an inside of the freezer 12 and 13.

The third door 40 may include a grip handle 41. The fourth door 50 may include a grip handle 51. The handle 41 of the third door 40 and the handle 51 of the fourth door 50 may be disposed to be spaced apart toward a left side and a right side with reference to a center area of the freezer 12 and 13.

Figure 4:
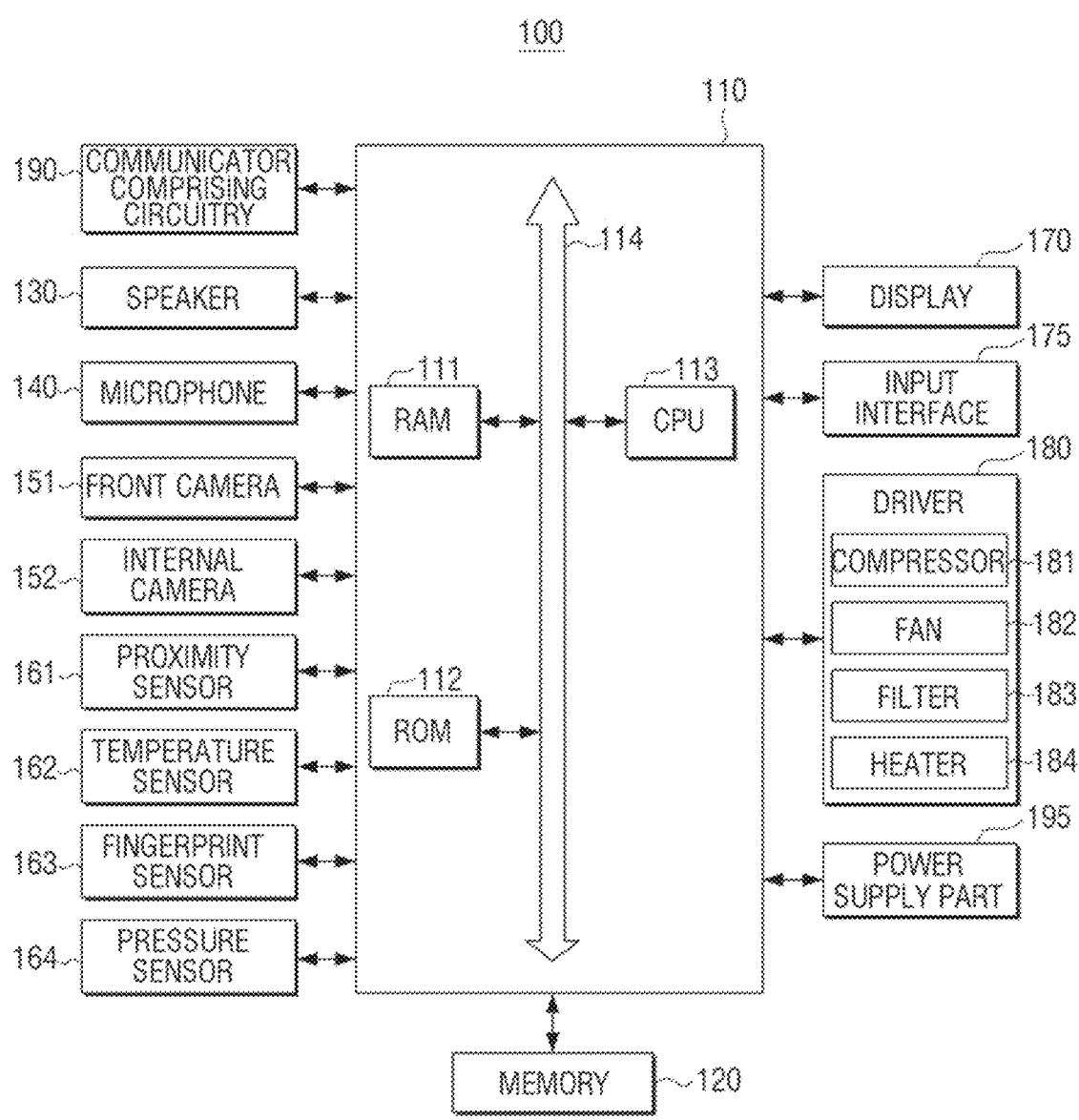
FIG. 4 is a block diagram provided to explain a configuration of a refrigerator, according to various embodiments of the disclosure.

FIG. 4 is a flowchart provided to explain a configuration of a refrigerator, according to an embodiment of the disclosure.

Referring to FIG. 4, the refrigerator 100 may include a processor 110, a memory 120, a speaker 130, a microphone 140, a front camera 151, an internal camera 152, a proximity sensor 161, a temperature sensor 162, a fingerprint sensor 163, a pressure sensor 164, a display 170, an input interface 175, a driver 180, a communicator comprising a circuitry 190, and a power supply part 195. According to implementations, although not illustrated, appropriate hardware/software elements apparent to those skilled in the art may be further included in the refrigerator 100. In addition, even the elements illustrated in the drawings may be excluded from the refrigerator 100 according to implementations.

The processor 110 is an element for controlling overall operations of the refrigerator 100. The processor 110 may perform a function of controlling a signal flow between the elements inside the refrigerator 100, and processing data. The processor 110 may, for example, drive an operating system and an application and control a number of hardware or software elements connected to the processor 110, and perform various data processes and calculations.

The processor 110 may include random access memory (RAM) 111, read only memory (ROM) 112, a central processing unit (CPU) 113, and a bus 114. The RAM 111, the ROM 112, the CPU 113, etc. may be connected to each other via the bus 114.

The RAM 111 may be used as an area for storage with respect to various operations carried out in the refrigerator 100. The RAM 111 may be used as a storage area for control information acquired from an external source, operation information of the refrigerator 100 or state information of the refrigerator 100. On the ROM 112, a control program for controlling the refrigerator 100 may be stored.

The processor 110 may be implemented as at least one general processor, a digital signal processor, an application specific integrated circuit (ASIC), a system on chip (SoC), a microcomputer, etc.

The processor 110 may control the communicator 190, the speaker 130, the microphone 140, the front camera 151, the internal camera 152, the proximity sensor 161, the temperature sensor 162, the fingerprint sensor 163, the pressure sensor 164, the display 170, the input interface 175, the driver 180, the memory 120, and the power supply part 195.

The refrigerator 100 may be connected to an external device via the communicator 190. The external device may be, for example, a mobile device 200, a server 300, and a home appliance device (e.g., air conditioner, washing machine and TV).

The communicator 190 may establish a communication network using wired or wireless communication. The refrigerator 100 may communicate with the external device via a mobile communication network, a wireless LAN communication network or a nearfield communication network. The wireless LAN communication may be connected to an access point (AP) wirelessly at a place the AP is installed. For example, Wi-Fi communication may be included. The nearfield communication may include Bluetooth communication, Bluetooth low energy communication, Wi-Fi direct, infrared data association (IrDA), ultra-wideband (UWB) communication, magnetic secure transmission (MST) communication and/or near field communication (NFC).

The refrigerator 100 may transmit, to an external device, operation information corresponding to an operation of the refrigerator (for example, temperature adjustment of each storage room) or state information corresponding to a state (for example, normal, abnormal, etc.) of the refrigerator 100 via the communicator 190, or acquire control information (for example, a control command corresponding to quick-freeze of the refrigerator 100) from an external source.

The speaker 130 may output a sound corresponding to various signals (for example, wireless signal, broadcast signal, audio source, video file or photo shoot). One or more speakers 130 may be provided.

One or more speakers 130 may be disposed on a front side and/or lateral side of the refrigerator 100. According to an embodiment, as illustrated in FIG. 2, the speaker 130 may be disposed adjacently to the display 170.

According to an embodiment, the speaker 130 may output an auditory feedback regarding display of a storage location of food within the refrigerator.

The microphone 140 may provide (or convert) a voice or sound acquired by the microphone 140 to an electrical signal. An electrical signal provided from the microphone 140 may be stored in the memory 120 or output via the speaker 175. One or more microphones 140 may be provided.

The front camera (or a first camera) 151 and the internal camera (or a second camera) 152 may capture a still image or a moving image.

The front camera 151 may be arranged to capture a front surface of the refrigerator 100. The processor 110 may identify the user based on a user face included in an image in which the user is captured by the front camera 151. In addition, a food may be captured by the front camera 151 before the user inputs the food into the refrigerator 100, and the processor 110 may identify the food included in the captured image, and record which food is stored in the refrigerator 100.

The internal camera 152 may be arranged to capture at least one of the storage rooms 11, 12 and 13. The internal camera 152 may be arranged at any position where the inside of the storage room 11, 12 and 13 can be captured in a state in which the doors 20, 30, 40 and 50 are closed.

According to an embodiment, one or more internal cameras 152 may be disposed on a rear side of the doors 20, 30, 40 and 50. For example, one or more internal cameras 152 may be disposed on a rear side of the doors 20 and 30 facing the storage room 11. For example, one or more internal cameras 152 may be disposed on a rear side of the door 40 facing the storage room 12. For example, one or more internal cameras 152 may be disposed on a rear side of the door 50 facing the storage room 13.

According to an embodiment, as described with reference to FIG. 3, the internal camera 152 may be arranged on the rotation bar 70 for sealing a gap between the doors.

The internal camera 152 may also be arranged on an inner wall of the storage rooms 11, 12 and 13.

The internal camera 152 may be a three-dimensional (3D) camera capable of acquiring a depth map. Alternatively, a depth map may be acquired through a stereo matching scheme using two internal cameras 152. Through the depth map, a relative position of the respective objects in the captured image may be identified. By reflecting the identified relative position, the generated 3D augmented-reality object may be disposed and displayed at an appropriate location on a front/rear/upper/lower space of the respective food objects. The processor 110 may store, in the memory 120, an image captured by one of the front camera 151 and the internal camera 152.

The proximity sensor 161 is a sensor detecting an object, for example without contact, which may be used to detect the presence of object near the refrigerator 100. The proximity sensor 161 may be disposed on a front surface of at least one of the doors 20, 30, 40 and 50, and one or more proximity sensors may be provided. The proximity sensor 161 may be implemented as, for example, an optical proximity sensor, a capacitive proximity sensor, an inductive proximity sensor, etc. The proximity sensor 161 may be an infrared (IR) proximity sensor.

An approach of an object may be detected not only through the proximity sensor 161 but also through the front camera 151 or the microphone 140.

The temperature sensor 162 may be used to detect a temperature of a storage room of the refrigerator 100.

The proximity sensor 161 may be disposed on a front surface of a door of the refrigerator 100. The temperature sensor 162 may be disposed inside a storage room.

The fingerprint sensor 163 may be used to recognize a user fingerprint. The fingerprint sensor 163 may be implemented as a sensor of various types. For example, the fingerprint sensor 163 may be an optical fingerprint recognition sensor that totally reflects the light radiated from a light source using a lens and a prism, and provides a reflected image showing a difference of reflectivity between valleys and ridges of a fingerprint. In addition, the fingerprint sensor 163 may be a capacitive fingerprint recognition sensor that measures capacitance of valleys and ridges of a fingerprint, and implements a measured electrical signal as a digital image. In addition, the fingerprint sensor 163 may be a temperature sensing fingerprint recognition sensor using a pyroelectric material that detects, when in contact with a fingerprint, a change of temperature by a temperature difference between valleys and ridges of the fingerprint, and generates an electrical signal.

The fingerprint sensor 163 may be arranged on at least one of the door handles 21, 31, 41 and 51. For example, the fingerprint sensor 163 may include, when the user grabs the handle 21, 31, 41 and 51, a contact surface for recognizing a fingerprint within a motion range in which fingers grabbing the handle naturally touches the handle.

A fingerprint image acquired through the fingerprint sensor 163 may be used to identify the user based on a corresponding stored image of the fingerprint of the user or characteristics of the valleys or ridges of the fingerprint of the user.

Figure 13:
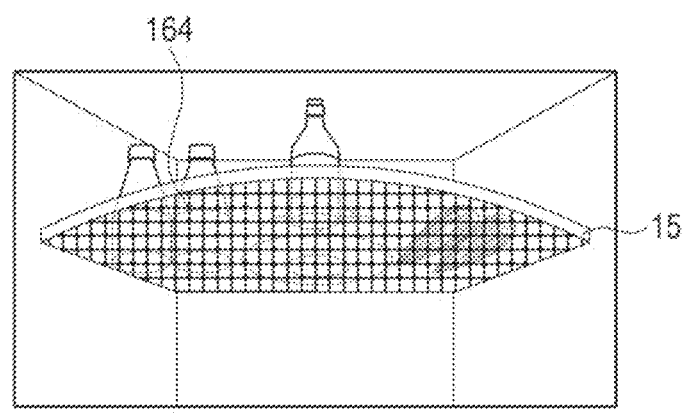
FIG. 13 is a diagram illustrating a refrigerator including a pressure sensor on a shelf, according to an embodiment of the disclosure.

The pressure sensor 164 may be arranged on a shelf of the refrigerator 10, and may identify a weight of an object placed on the shelf. The pressure sensor 164 may be arranged in an array form on the shelf. FIG. 13 illustrates an arrangement form of the pressure sensor 164, according to an embodiment of the disclosure.

Referring to FIG. 13, a plurality of pressure sensors 164 may be arranged at intersection points of lines of the shelf 15 of the refrigerator. The pressure sensor 164 may include an array interval of less than or equal to 1 mm. The processor 110 may identify a bottom surface shape and weight of food placed on the shelf based on a pressure detected by the pressure sensor 164. For example, the processor 110 may identify a position of each food based on an image captured by the internal camera 152 and a pressure detected by the pressure sensor 164.

Further, the refrigerator 100 may include various sensors. For example, a sensor detecting a door open and close of the refrigerator, an illumination sensor detecting an intensity of light around the refrigerator 100 for adjusting brightness of the display 170, etc. may be further included.

The display 170 may provide (or display) a graphical user interface (GUI) corresponding to various services (for example, voice call, video call, data transfer, broadcast reception, photo capturing, video content viewing, or electronic payment including mobile payment).

The display 170 may be, for example, a liquid crystal display (LCD), a light-emitting diode (LED) display, and an organic light-emitting diode (OLED) (for example, active-matrix organic light-emitting diode (AMOLED), passive-matrix OLED (PMOLED), or microelectromechanical systems (MEMS)) display.

The input interface 175 may acquire a user input, and transfer the acquired user input to the processor 110. The input interface 175 may be, for example, at least one of a touch sensor, a (digital) pen sensor, a pressure sensor or a key. The touch sensor may use, for example, at least one method from among a capacitive method, a decompressive method, an infrared method, or an ultrasonic method. The (digital) pen sensor may be, for example, a part of a touch panel, or may include an additional sheet for recognition. The key may include, for example, a physical button, an optical key, or keypad. The input interface 175 may convert audio signals detected by the microphone 140 into text for analysis by the processor 110 to execute corresponding commands.

The display 170 and the touch sensor of the input interface 175 may be a mutual layer structure and implemented as a touch screen.

The processor 110 may, for example, display a shortcut icon (or also referred to as "an icon") selected from among shortcut icons corresponding to applications displayed on the touch screen 170 to correspond to a touch input to the display 170 implemented as a touch screen distinguishably from the other unselected shortcut icons, or execute an application corresponding to the selected shortcut icon (for example, video application) and display a video application content on the display 170.

The driver 180 may include a compressor 181, a fan 182, a filter 183 or a heater 184 operating under the control of the processor 110. The driver 180 may further include a lighting element or a deodorizer.

The compressor 181 may compress a refrigerant that is working fluid of refrigeration cycle under the control of the processor 110. The refrigeration cycle may include a condenser converting a gaseous refrigerant compressed by the compressor 181 into a liquid refrigerant, an expander decompressing the liquid refrigerant, and an evaporator vaporizing the decompressed liquid refrigerant. The processor 110 may control a temperature of a storage room through vaporization of the liquid refrigerant. In addition, the refrigerator 100 may control the temperature of the storage room through a peltier module using the peltier effect, and a magnetic cooling device using the magnetocaloric effect.

The fan 182 may circulate the outside air under the control of the processor 110. The air heated by the cooling cycle may be cooled by heat exchange through the outside air.

The filter 183 may sterilize (or remove) bacteria floating or attached inside the storage room under the control of the processor 110. The filter 183 may include an ion sterilization cleaning part.

The heater 184 may remove generated frost under the control of the processor 110. The heater 184 may include a defrost heater.

The power supply part 195 may supply power to the elements of the refrigerator 100 under the control of the processor 110. The power supply part 195 may supply power input from an external power source via a power cord to the respective elements of the refrigerator 100 under the control of the processor 110.

The memory 120 may store various data, programs or applications which are used to drive and control the refrigerator 100.

The memory 120 may include, for example, an internal memory or an external memory.

The internal memory may include, for example, at least one of a volatile memory (e.g., dynamic RAM (DRAM)), static RAM (SRAM) or synchronous dynamic RAM (SDRAM), and so on), a non-volatile memory (e.g., one time programmable ROM (OTPROM), programmable ROM (PROM), erasable and programmable ROM (EPROM), electrically erasable and programmable ROM (EEPROM), mask ROM, flash ROM, and so on), a hard disk drive (HDD) or a solid state drive (SSD).

The external memory may include a flash drive, for example, compact flash (CF), secure digital (SD), micro secure digital (micro-SD), mini secure digital (mini-SD), extreme digital (xD), multi-media card (MMC), memory stick or the like. The external memory may be connected functionally and/or physically to the refrigerator 201 through a variety of interfaces, such as a USB interface.

The memory 120 may be accessed by the processor 110 and may read/record/correct/delete/update data under the control of the processor 110. According to an embodiment, the term "memory" as used herein may include a memory 120, a ROM 112, and a RAM 111 within the processor 110, or a memory card mounted on the refrigerator 100 (e.g., micro SD card, memory stick).

The memory 120 may store computer executable instructions for performing a method of controlling of a refrigerator as described herein.

The memory 120 may store a signal or data (for example, data corresponding to food management (or food recognition)) input or output according to operations of the elements under the control of the processor 110. The memory 120 may store a graphical user interface (GUI) related to a control program for controlling the refrigerator 100 or the processor 110 and applications provided by the manufacturer or downloaded from the outside (for example, food management application or food recognition application, application for food purchase, food reminder application, morning brief application, etc.), images corresponding to the GUI, food information, user information, documents, databases or data related thereto.

The memory 120 may include software and/or firmware including one or more modules. The module may correspond to a set of computer executable instructions.

To provide services according to the various embodiments of the disclosure, the memory 120 may include various modules, which will be described with reference to FIG. 5.

Figure 5:
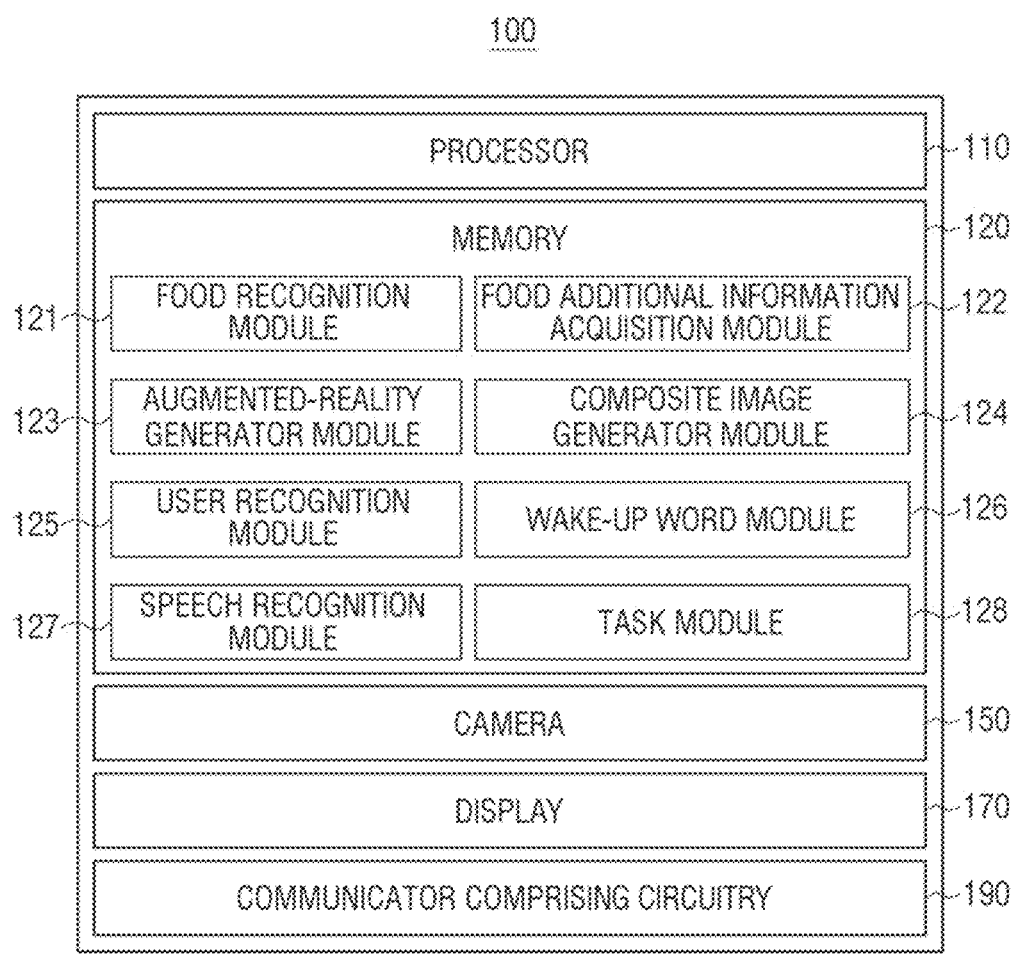
FIG. 5 is a block diagram provided to explain a configuration of a refrigerator, according to various embodiments of the disclosure.

FIG. 5 is a diagram provided to explain modules that may be stored within the memory 120 of the refrigerator 100, according to an embodiment of the disclosure.

Referring to FIG. 5, the refrigerator 100 may include a processor 110, a memory 120, a display 170, a camera 150 (a front camera 151 and/or an internal camera 152), and a communicator 190 comprising a circuitry. The descriptions of the elements described with reference to FIGS. 2 to 4 may be, by reference, incorporated in the descriptions of the above-mentioned elements described above. Further, the refrigerator 100 may further include at least one other element described with reference to FIGS. 2 to 4.

The memory 120 may include software implemented as a food recognition module 121, a food additional information acquisition module 122, an augmented-reality object generator module 123, a composite image generator module 124, a user recognition module 125, a wake-up word module 126, a speech recognition module 127 and a task module 128. The modules 121, 122, 123, 124, 125, 126, 127 and 128 may be executed by the processor 110 to provide various services.

The food recognition module 121 may be executed by the processor 110 and identify at least one object in an image. For example, the food recognition module 121 may identify (the presence) of at least one product in an image captured by the camera 151, and recognize (a type of) the identified food. The food recognition module may be implemented in a server or the refrigerator. The food recognition in the refrigerator and the food recognition in the server may be implemented in a hybrid form. In a case that the food recognition in the refrigerator is impossible, it may be performed by the server.

The processor 110 may acquire an image in which food is captured through the front camera 151 or the internal camera 152. The processor 110 may, when a specific event has occurred, control the internal camera 152 to perform capturing. For example, when an event that a door is opened and closed occurs, the processor 110 may control the internal camera 152 to perform capturing. As another example, the processor 110 may control the internal camera 152 to perform capturing in a predetermined period of time (for example, once every 30 minutes). As another example, the processor 110 may, when a user approach is detected through the proximity sensor 161 or the front camera 151, control the front camera 151 or the internal camera 152 to perform capturing.

The memory 120 may store an image (still image or moving image) captured by the front camera 151 or the internal camera 152. In addition, the memory 120 may store various types of comparison food images for comparison with the captured image. The various types of comparison food images may include a number (for example, tens or hundreds) of food images for each type of food. In a case that a carrot is included in the captured image, comparison may be made between the captured image and a comparison food image including various carrot images such as various carrot shapes, sizes, colors, cleaning conditions, or whether the carrot is packed.

The food recognition module 121 may, when a specific event has occurred, perform food recognition of an image. For example, when a current captured image is changed (for example, when it is determined that a new food is added) as compared with a previous in-fridge image, the food recognition may be performed. Alternatively, when a weight change of an object placed on a shelf of the refrigerator 100 is detected through the pressure sensor 164 arranged on the shelf, food recognition may be performed. Alternatively, when a manipulation to initiate food recognition is input by a user via the input interface 175 or a voice command to initiate food recognition is input via the microphone 140, the food recognition may be performed.

Figure 12:
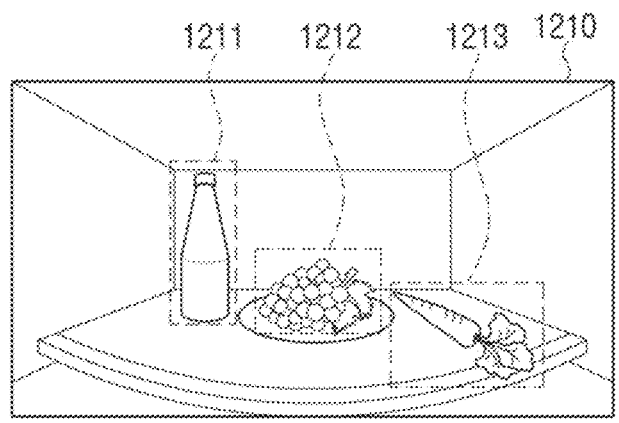
FIG. 12 is a diagram illustrating an embodiment in which a food is identified in an image of inside-storage-room captured by a camera.

The food recognition module 121 may identify each food within the image using an image segmentation algorithm to identify (or distinguish) objects in the image from the background. In this case, an artificial intelligence model trained to identify at least one food in the image may be included. This model may be a model trained to include a standard for identifying an object in the image from the background. For example, referring to FIG. 12, the food recognition module 121 may input an in-fridge image 1210 to the trained model, and acquire three food images 1211, 1212 and 1213.

However, for a food only partially visible in the image, the food recognition module 121 may provide a normal image of the food (a food image that is not obscured). According to an embodiment, the food recognition module 121 may identify, using the image segmentation algorithm, individual food in an image captured by the internal camera 152, and compare the identified food with an image of a normal food (a food image that is not obscured) stored in the memory 120, and identify the food with occlusion. In a case that the food with occlusion is identified, the food recognition module 121 may provide a normal food image using a generative adversarial network (GAN). The image of the food provided in the occlusion may be displayed by adjusting the transparency, and overlaid on an image of an object displayed in front.

In addition, the food recognition module 121 may recognize food based on the image of the food acquired (or provided) from the image as described above. Recognizing food means identifying the variety, brand, or type of food.

The food recognition module 121 may recognize food using an artificial intelligence model trained to recognize the food based on an image of food. This model may be, for example, trained using various carrot images such as various carrot shapes, sizes, colors, cleaning conditions or whether a carrot is packed as learning data to recognize the carrot. When an image of food is input to the model trained as described above, it is possible to acquire, for example, a name of food. For example, referring to FIG. 12, the food recognition module 121 may input the three object images 1211, 1212 and 1213 to the trained model, and acquire "milk", "grape" and "carrot" as food names. The food recognition module 121 may store the acquired food names in association with food images. The food additional information acquisition module 122 may acquire additional information on the food recognized in the food recognition module 121, and store the acquired additional information in the memory 120.

The additional information on the food may include, for example, information regarding a position of the food in the storage room, information regarding the ingredients constituting the food, information regarding the calories of the food, information regarding the type of the food (e.g., vegetable, meat, fast food, etc.), information regarding the shelf life, information regarding the presence or absence of allergic components, etc. At least some of the additional information mentioned above may be provided from an external server communicatively connected to the module. In addition, the user may input the additional information on the food directly via the input interface 175 or via the microphone 140 by voice.

The food additional information acquisition module 122 may store the additional information on the food in association with the food image and food name acquired in the food recognition module 121.

Meanwhile, in addition to a method of recognizing food based on the captured image and acquiring information on the food, the food may be recognized through a manual manipulation of the user. For example, the user may acquire information on the food by recognizing a barcode of the food, a receipt for purchasing the food, a tag, etc. may be recognized through a scanner or front camera 151 provided in the refrigerator 100.

As another example, when the user inputs food to the refrigerator 100, information on the food may be directly input through the input interface 175, and when the user says a word that explains information on the food when the user inputs the food to the refrigerator, the voice may be acquired through the microphone 140 and the food information may be input. The processor 110 may capture a food newly input to the refrigerator 100, and associate the captured food image with the information input by the user and store in the memory 120.

As described above, according to embodiments in which the user directly inputs food information, food information on a food that is unrecognizable through capturing (for example, food contained in a black bag, an opaque container, etc. or a food obscured by a different food) may be provided. An augmented-reality object according to the food information may be provided, and according to an operation that the user touches and rubs a black bag image in an in-fridge image, the generated augmented-reality object may be overlapped near the touched area and displayed. For example, the augmented-reality object provided to correspond to the touched area may be displayed in a gradual manner.

The augmented-reality object generator module 123 may provide an augmented-reality object displayed together with the captured in-fridge image so that the user feels as if the augmented-reality object were present in the refrigerator.

According to an embodiment, the augmented-reality object generator module 123 may provide an augmented-reality object corresponding to a food inside the captured in-fridge image. According to an embodiment, the augmented-reality object generator module 123 may provide an augmented-reality object corresponding to a food inside the captured in-fridge image.

The augmented-reality object generator module 123 may include an artificial intelligence model trained to acquire a similar augmented-reality object to an object in an image based on the image. The trained model may be trained based on a generative adversarial network (GAN) or a variational auto-encoder (VAE).

Figure 14:
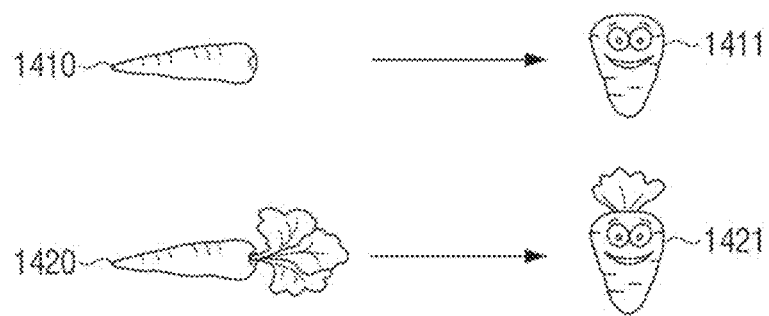
FIG. 14 is a diagram provided to explain a method for generating an augmented reality object, according to an embodiment of the disclosure.

For example, when a food image is input to the trained model, an augmented-reality object resembling the food may be acquired. As another example, when an image of a user face is input to the trained model, an augmented-reality object resembling the user face may be acquired. FIG. 14 is a diagram illustrating an example augmented-reality object.

Referring to FIG. 14, the augmented-reality object generator module 123 may input a carrot image 1410 without leaves included in an image captured by the internal camera 152 to the trained model, and acquire an augmented-reality object 1411 corresponding to the carrot without leaves. Referring to FIG. 14, the augmented-reality object generator module 123 may input a carrot image 1420 without leaves included in an image captured by the internal camera 152 to the trained model, and acquire an augmented-reality object 1421 corresponding to the carrot without leaves.

As described above, an augmented-reality object resembling an actual food shape may be acquired using the trained model.

According to another embodiment, the memory 120 may store augmented-reality objects of various foods, and the augmented-reality object generator module 123 may search the memory 120 for an augmented-reality object corresponding to an identified food, and acquire the found augmented-reality object.

The augmented-reality object generator module 123 may provide a user-customized augmented-reality object in consideration of user feature information such as age, sex, etc. of the user. For example, if the user is a child, the augmented-reality object may be provided as a cartoon character. In addition, the augmented-reality object generator module 123 may provide a user-customized augmented-reality object based on profile information of the user.

The composite image generator module 124 may synthesize an augmented-reality object provided by the augmented-reality object generator module 123 with an in-fridge image.

The composite image generator module 124 may arrange the augmented-reality object so that the augmented-reality object and the actual object are harmonized well. To this end, the composite image generator module 124 may first identify an actual position of the object.

According to an embodiment, the composite image generator module 124 may identify an arrangement of food in the captured image. The composite image generator module 124 may identify the arrangement of the recognized food based on the pressure sensor 164 arranged on the shelf of the refrigerator 100 and/or an image captured by the internal camera 152. For example, referring to FIG. 13, the plurality of pressure sensors 164 may be arranged in an array form, and detect a pressure at a place where each food is arranged. The composite image generator module 124 may match this pressure detection result with foods in the image captured by the internal camera 152 so that an arrangement position of food may be identified.

The composite image generator module 124 may identify a relative distance between a food with occlusion and a food disposed at the occlusion. For example, the composite image generator module 124 may identify that a canned food is obscured by a carrot in front in the image captured by the internal camera 152, and identify that the carrot is disposed in front of the canned food.

According to another embodiment, the internal camera 152 may include a three-dimensional (3D) camera capable of acquiring a depth map. Alternatively, a depth map may be acquired through a stereo matching scheme using two internal cameras 152. The composite image generator module 124 may identify a relative position of each food in the captured image through the depth map. The information on the position acquired as described above may be transferred to the food additional information acquisition module 122.

The composite image generator module 124 may identify a relative position of each food in the captured image through the depth map.

The composite image generator module 124 may provide a composite image by overlaying (or overlapping) the image with an augmented-reality object based on a position and surface of the food in the image. For example, the composite image generator module 124 may overlay the image with the augmented-reality object so that the augmented-reality object is collinear with the surface of the foods in the image. For example, a recipe service may be associated with the augmented-reality object. The composite image generator module may, based on foods included in the recipe service and information on the recognized food in the refrigerator linked respectively thereto, provide the recipe guide by moving the augmented-reality object to positions of the linked foods.

A composite image provided by the composite image generator module 124 may be displayed on the display 170. An example composite image provided by the composite image generator module 124 is illustrated in FIG. 15.

Figure 15:
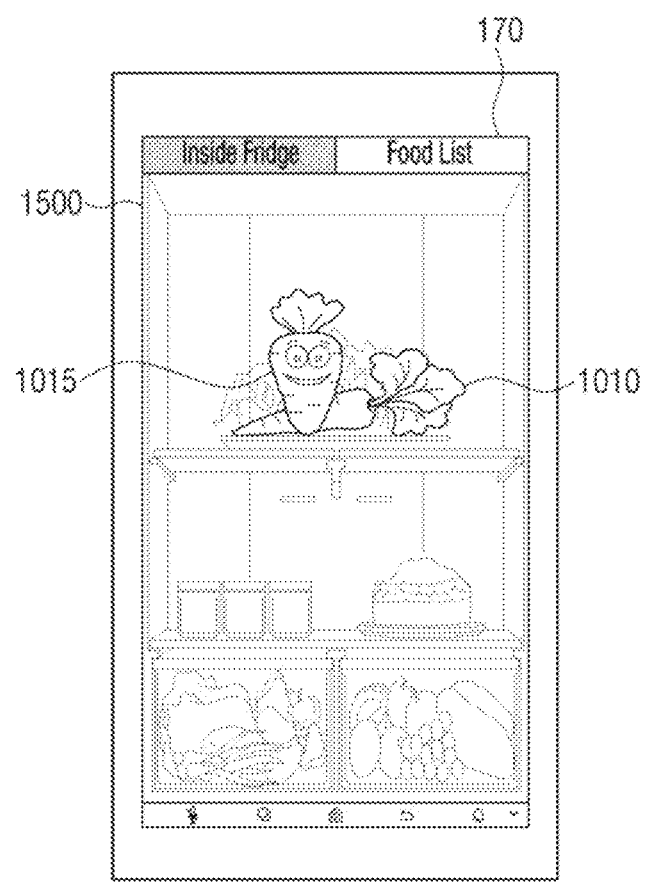
FIG. 15 is a diagram provided to explain provision of an augmented reality object by a refrigerator, according to various embodiments of the disclosure.

FIG. 15 is a diagram illustrating an example composite image provided by overlaying an image with an augmented-reality object, according to an embodiment of the disclosure.

Referring to FIG. 15, the processor 110 may control the display 170 so that an augmented-reality object 1015 corresponding to a food 1010 identified in an image captured by the internal camera 152 is displayed together with the image 1500.

The composite image generator module 124 may provide a composite image by overlaying a place the food is located with the augmented-reality object 1015 in the image captured by the internal camera 152. For example, for a food contained in a black bag, an augmented-reality object may be overlaid on a place with the black bag. In this case, the user can readily identify the food contained in the black bag.

The composite image generator module 124 may simply overlay the augmented-reality object 1015 on the food 1010. That is, the augmented-reality object 1015 may always be displayed in front of the food 1010.

Figure 16:
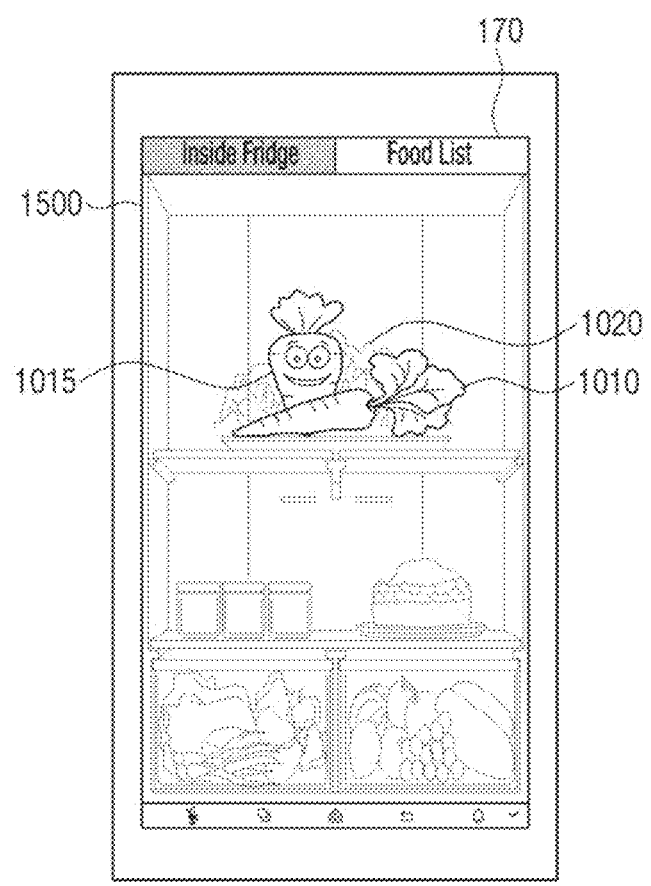
FIG. 16 is a diagram provided to explain provision of an augmented reality object by a refrigerator, according to various embodiments of the disclosure.

Alternatively, the augmented-reality object may be displayed in 3D in consideration of an arrangement position of food. For example, the composite image generator module 124 may identify an arrangement position of foods based on the pressure sensor 164 arranged on the shelf of the refrigerator 100 and/or an image captured by the internal camera 152, and arrange the augmented-reality object in 3D based on the identified arrangement position. For example, as illustrated in FIG. 16, the augmented-reality object 1015 may be displayed between the actual carrot 1010 and the actual cabbage 1020. Alternatively, the augmented-reality object may be displayed in a state of being placed on the food. As described above, the augmented-reality object may be provided to cause an illusion that the object is actually present in the refrigerator 100.

The user recognition module 125 may recognize a user of the refrigerator 100.

The user recognition module 125 may acquire user identification information, and compare the acquired user identification information with pre-stored user identification information and identify the user. The user identification information may be, for example, a user ID (or password), or biometric information such as face, voice, fingerprint and the like.

The user ID may be directly input by the user through the input interface 175 and acquired. The face may be acquired through the front camera 151. The voice may be acquired through the microphone 140. The front camera 151 and the microphone 140 may be activated when a user presence is detected by the proximity sensor 161. The user fingerprint may be acquired through the fingerprint sensor 163. For example, the fingerprint sensor 163 may be provided on a handle of the refrigerator 100. The processor 110 may identify the user grasping the handle of the refrigerator 100 through the fingerprint sensor 163. Accordingly, the refrigerator 100 can identify the user only by the user opening the refrigerator door.

The user recognition module 125 may search the memory 120 for user identification information corresponding to the input user identification information, and identify the user. The processor 110 may, when user identification information corresponding to the input user identification information is not found in the memory 120, identify that the user is a new and initiate procedures for registering the user.

The wake-up word module 126 may recognize a preset wake-up word or phrase within an audio signal. For example, the wake-up word module 126 may recognize a wake-up word (e.g., Bixby) included in a user voice acquired via the microphone 140. When the wake-up word is recognized, a speech recognition function of the refrigerator 100 may be activated. For example, the wake-up word module 126 may activate a recording function of the microphone 140, and activate (or drive) the speech recognition module 127.

The speech recognition module 127 may perform speech recognition. The speech recognition module 127 may use an automatic speech recognition (ASR) technology. The speech recognition module 127 may convert an audio signal corresponding to a user voice to a text data.

The speech recognition module 127 may include a feature acquisition part and a decoder. The feature acquisition part may acquire feature information (feature vector) from an audio signal. In addition, the decoder may acquire speech recognition information corresponding to the feature information based on an acoustic model and a language model. The speech recognition information may include a text data acquired based on pronunciation information corresponding to feature information acquired based on the acoustic model and phoneme information corresponding to feature information acquired based on the language model.

When text data is acquired from the audio signal through the speech recognition module 127, the text data may be transferred to the task module 128.

The task module 128 may analyze the text data transferred from the speech recognition module, analyze the meaning thereof, and perform a task corresponding to the meaning. The task module 128 may use a natural language processing (NLP) technology.

The task module 128 may identify a task to be performed, based on the analyzed meaning. Various types of tasks, such as music production, schedule setting, memo input, response to query and the like, may be performed. In the task to provide a response to a query, for example, in response to a user voice of "Tell me carrot recipes", the task module 128 may output a response of "Here are carrot soup recipes" through the speaker 130 or the display 170.

According to an embodiment, an artificial intelligence agent program for performing tasks may be stored in the refrigerator 100.

The artificial intelligence agent program is a program for providing an artificial intelligence (AI)-based service (for example, speech recognition service, secretary service, translation service, search service, etc.), which may be executed by a previous general processor (for example, CPU) or an additional AI exclusive processor (for example, GPU, NPU, etc.). The processor 110 may include at least one of a general processor or an AI exclusive processor.

For example, the artificial intelligence agent program may include a dialogue system capable of processing user queries and responses in natural language. The dialogue system may be configured to include the speech recognition module 127 and the task module 128.

Figure 7:
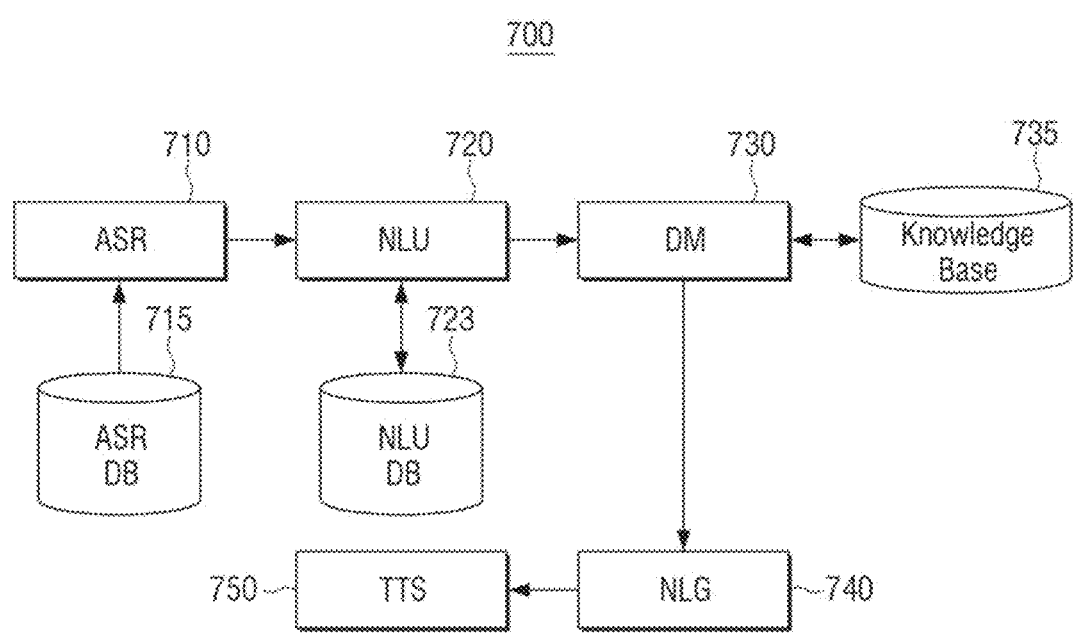
FIG. 7 is a block diagram illustrating a dialogue system of an artificial intelligence agent system, according to an embodiment of the disclosure.

FIG. 7 is a block diagram provided to explain a dialogue system, according to an embodiment of the disclosure.

A dialogue system illustrated in FIG. 7 is an element for performing dialogue with a virtual artificial intelligence agent in natural language, which may be, according to an embodiment of the disclosure, stored in the memory 120 of the refrigerator 100. However, this is only an example, and at least one of elements included in the dialogue system 700 may be included in at least one external server.

The dialogue system 700 may include, as illustrated in FIG. 7, an automatic speech recognition (ASR) module 710, a natural language understanding (NLU) module 720, a dialogue manager (DM) module 730, a natural language generator (NLG) module 740, and a text to speech (TTS) module 750. Further, the dialogue system 700 may further include a path planner module or an action planner module.

The automatic speech recognition (ASR) module 710 may convert a user input (in particular, a user query) acquired from the refrigerator 100 to a text data. For example, the automatic speech recognition module 710 may include an utterance recognition module. The utterance recognition module may include an acoustic model and a language model. For example, the acoustic model may include information related to vocalization, and the language model may include unit phoneme information and information on the combination of unit phoneme information. The utterance recognition module may convert a user utterance to a text data using the information the information related to vocalization and the unit phoneme information. The information on the acoustic model and the language model may be, for example, stored in the automatic speech recognition database (ASR DB) 715.

The natural language understanding module 720 may perform syntactic analysis or semantic analysis and identify a user's intention. The syntactic analysis may include dividing a user input into syntactic units (for example, words, phrases, morphemes, etc.) and identify what syntactic elements the syntactic units include. The semantic analysis may be performed using semantic matching, rule matching, formula matching, etc. Accordingly, the natural language understanding module 720 may acquire a domain to which a user input belongs, an intent of the user input, or parameters (or slots) necessary for expressing the intent.

The natural language understanding module 720 may identify a user's intention and parameters using a matching rule divided into a domain, an intent, and a parameter (or slot) necessary for identifying the intent. For example, one domain (for example, alarm) may include a plurality of intents (for example, alarm setting, alarm disable, etc.), and one intent may include a plurality of parameters (for example, time, number of repetitions, alarm sound, etc.). The plurality of rules may include, for example, one or more essential element parameters. The matching rule may be stored in a natural language understanding database (NLU DB) 723.

The natural language understanding module 720 may identify the meaning of words acquired from the user input using linguistic features (for example, syntactic element) such as morphemes, phrases and the like, and match the identified word meaning with the domain and the intent and identify the user intent. For example, the natural language understanding module 720 may calculate how many words acquired from the user input are included in each domain and intent, and identify the user intent. According to an embodiment, the natural language understanding module 720 may identify parameters of the user input using words serving as a basis for identifying the intent. According to an embodiment, the natural language understanding module 720 may identify the user intent by using the natural language recognition database 723 in which a linguistic feature for identifying intent of a user input is stored.

The natural language understanding module 720 may provide a path rule based on intent and parameters of the user input. For example, the natural language understanding module 720 may select an application to be executed based on the intent of the user input, and identify an operation to be performed in the selected application. The natural language understanding module 720 may identify parameters corresponding to the identified operation and provide a path rule. According to an embodiment, the path rule provided by the natural language understanding module 720 may include information on the application to be executed, the operation to be executed in the application and the parameters necessary for executing the operation.

The natural language understanding module 720 may provide one or more path rules based on the intent and parameters of the user input. For example, the natural language understanding module 720 may acquire a path rule set corresponding to the refrigerator 100 from the path planner module, and map the intent and parameters of the user input with the acquired path rule set and identify the path rule. The path rule may include information on an operation for performing functions of the application or information on parameters necessary for executing the operation. In addition, the path rule may include an order of operation of the application. An electronic device may acquire the path rule, select an application according to the path rule, and execute an operation included in the path rule in the selected application.

The natural language understanding module 720 may identify an application to be executed, an operation to be executed in the application, and parameters necessary for executing the operation based on the intent and parameters of the user input, and provide one or more path rules. For example, the natural language understanding module 720 may arrange the application to be executed and the operation to be executed in the application in an ontology or graph model form according to the intent of the user input by based on the information of the refrigerator 100, and provide the path rule. The provided path rule may be, for example, stored in a path rule database through the path planner module. The provided path rule may be added to the path rule set of the database 723.

The natural language understanding module 720 may select at least one path rule from among the plurality of provided path rules. For example, the natural language understanding module 720 may select an optimum path rule from among the plurality of path rules. As another example, the natural language understanding module 720 may, when only some operation is specified based on a user utterance, select a plurality of path rules. The natural language understanding module 720 may identify one path rule from among the plurality of path rules by an additional input of the user.

The dialogue manager module 730 may identify whether a user intent identified by the natural language understanding module 720 is clear. For example, the dialogue manager module 730 may identify whether the user intent is clear based on whether sufficient parameter information is provided. The dialogue manager module 730 may identify whether parameters identified in the natural language understanding module 720 are sufficient to perform a task. According to an embodiment, the dialogue manager module 730 may, when the user intent is unclear, perform feedback to request necessary information to the user. For example, the dialogue manager module 730 may perform feedback requesting information on the parameters for identifying the user intent.

According to an embodiment, the dialogue manager module 730 may include a content provider module. The content provider module may, in a case that an operation may be performed based on the intent and parameters identified in the natural language understanding module 720, provide a result of performing a task corresponding to a user input.

According to another embodiment, the dialogue manager module 730 may provide a response to a user query using the knowledge database 735.

The knowledge database 735 may include a personalization knowledge database. The personalization knowledge database may learn a relationship between knowledge information based on at least one of a user interaction input to the refrigerator 100, a search history of the user, sensing information sensed by the refrigerator 100, or user information acquired from an external device. The personalization knowledge database may be updated while learning new knowledge information as the refrigerator 100 is used. The personalization knowledge database may store the relationship between the knowledge information in an ontology form. Storing the knowledge information in the form of ontology is only an example, and the information may be stored in the form of a data set.

The natural language understanding module 720 may identify user intent by referring to the personalization knowledge database, and identify whether the intent is accurate.

The knowledge database 735 may be included in the refrigerator 100. However, this is only an example, and the knowledge database 735 may be included in an external server.

The natural language generator module 740 may change designated information to a text form. The information changed to the text form may be in the form of a natural language utterance. The designated information may be, for example, information on an additional input, information guiding the completion of an operation corresponding to a user input, or information guiding an additional input of the user (for example, feedback information regarding the user input). The information changed to the text form may be displayed on the display 170 of the refrigerator 100 or may be changed to a speech form by the text to speech (TTS) module 750.

When the information changed to the text form is provided on the display 170 of the refrigerator 100, it may be provided with an effect as if the augmented-reality object were saying something. For example, the information changed to the text form may be included in a speech bubble and displayed near the augmented-reality object.

The text to speech (TTS) module 750 may change the information of the text form to information of a speech form. The text to speech (TTS) module 750 may acquire information of a text form from the natural language generator module 740, and change the information of the text form to the information of the speech form and output the information of the speech form to the speaker 130.

When the information of the speech form is provided to the speaker 130 of the refrigerator 100, such information may be provided with an effect as if the augmented-reality object were saying something. For example, while the information of the speech form is output through the speaker 130, an animation effect may be provided such that the mouth of the augmented-reality object is animated to move.

The automatic speech recognition (ASR) module 710 may be implemented as a speech recognition module 127 of FIG. 5. The natural language understanding module 720, the dialogue manager module 730, the natural language generator module 740 and the text to speech (TTS) module 750 may be implemented as a task module 128 of FIG. 5.

Meanwhile, at least one of the modules 121, 122, 123, 124, 125, 126, 127 and 128 of FIG. 5 may not be provided in the refrigerator 100, but may be provided in an external device such as the server 300. In this case, a function of a module not provided in the refrigerator 100 may be performed in an external device and the execution result may be transferred to the refrigerator 100.

The processor 110 may, as described above, execute computer executable instructions (modules) stored in the memory 120 so that various functions may be thereby performed.

According to an embodiment, the processor 110 may, by executing the computer executable instructions stored in the memory 120, acquire an augmented-reality object corresponding to a food included in an image captured by the camera 150 using a trained artificial intelligence model, control the display 170 to display the acquired augmented-reality object as being overlapped with the captured image, and when a user input is acquired while the acquired augmented-reality object is displayed, provide a response to the user input based on the acquired augmented-reality object.

It may be easily understood by those skilled in the art that at least one of the above-described elements of the refrigerator 100 may be added, omitted or modified to correspond to the performance of the refrigerator 100.

In the embodiments described above, food recognition, acquisition of food additional information, provision of an augmented-reality object, provision of a composite image, user recognition, speech recognition, task performance, etc. are processed in the refrigerator 100. However, such functions may be processed in the mobile device 200 or processed in the server 300. An embodiment in which the server 300 processes the above-described functions will be described with reference to FIG. 6.

Figure 6:
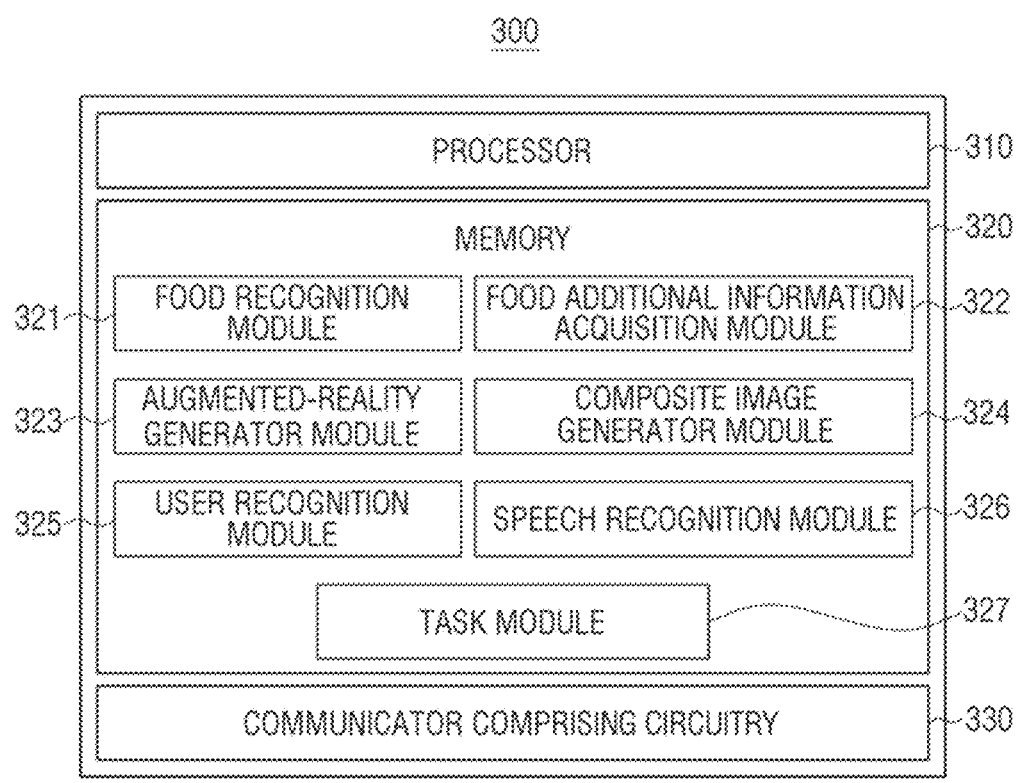
FIG. 6 is a block diagram provided to explain a configuration of a server connected to a refrigerator, according to an embodiment of the disclosure.

FIG. 6 is a diagram provided to explain a configuration of the server 300, according to an embodiment of the disclosure.

Referring to FIG. 6, the server 300 may include a processor 310, a memory 320, and a communicator comprising a circuitry 330.

The processor 310 is an element for controlling overall operations of the server 300. For example, the processor 310 may control a number of hardware or software elements connected to the processor 310 by executing an operating system and an application, and perform various data processing and calculations. The processor 310 may be a central processing unit (CPU) or a graphics-processing unit (GPU), or both. The processor 310 may be implemented as at least one general processor, a digital signal processor, an application specific integrated circuit (ASIC), a system on chip (SoC), a microcomputer (MICOM) and the like.

The memory 320 may include, for example, an internal memory or an external memory. The memory 220 is accessed by the processor 310 and reading/recording/editing/deletion/update of data by the processor 310 may be performed.

The memory 320 may include software and/or firmware implemented as one or more modules. The module may correspond to a set of computer executable instructions.

The memory 320 may include a food recognition module 321, a food additional information acquisition module 322, an augmented-reality object generator module 323, a composite image generator module 324, a user recognition module 325, a speech recognition module 326 and a task module 327. The modules 121, 321, 322, 323, 324, 325, 326 and 327 may be executed by the processor 310 to perform various functions.

The food recognition module 321 may perform the same function as the food recognition module 121 described above. Particularly, the server 300 may acquire an image captured by the front camera 151 or internal camera 152 of the refrigerator 100 via the communicator 330, and the food recognition module 321 may perform a process such as food identification, recognition, etc. as described above, based on the acquired image.

The food additional information acquisition module 322 may perform the same function as the food additional information acquisition module 122 described above.

The augmented-reality object generator module 323 may perform the same function as the augmented-reality object generator module 123 described above. For example, an augmented-reality object image provided by the augmented-reality object generator module 323 may be transmitted to the refrigerator 100 via the communicator 330, and the composite image generator module 124 of the refrigerator 100 may synthesize the acquired augmented-reality object image with an in-fridge image.

The composite image generator module 324 may perform the same function as the composite image generator module 124 described above. For example, a composite image provided by the composite image generator module 324 may be transmitted to the refrigerator 100 via the communicator 330 and displayed on the display 170 of the refrigerator 100.

The user recognition module 325 may perform the same function as the user recognition module 125 described above. In particular, the server 300 may acquire user information (e.g., fingerprint, face image, and voice) collected through the refrigerator 100 or the mobile device 200 via the communicator 330. The user recognition module 325 may recognize the user based on the acquired user information, and transfer the recognition result to the refrigerator 100 or the mobile device 200 via the communicator 330.

The speech recognition module 326 may perform the same function as the speech recognition module 127 described above. For example, the server 300 may acquire an audio signal corresponding to a user voice collected through the refrigerator 100 or the mobile device 200 via the communicator 330, and the speech recognition module 326 may process the acquired audio signal and acquire text data. In addition, the speech recognition module 326 may transmit the text data to the refrigerator 100 or the mobile device 200 via the communicator 300. For example, the task module 128 of the refrigerator 100 may analyze the text data acquired from the server 300 and analyze the meaning thereof, and perform a task corresponding to the meaning.

The task module 327 may perform the same function as the task module 128 described above. For example, the task module 327 may perform a task of analyzing a text data acquired through the speech recognition module 326 or a text data acquired through the speech recognition module 127 of the refrigerator 100 and acquired in the server 300, and analyzing the meaning thereof so an operation corresponding to the meaning is provided in the refrigerator 100 or the mobile device 200. For example, if a text data is "Tell me carrot recipes", the task module 327 may perform a task of transmitting a control signal to output a response of "Here are carrot soup recipes" to the refrigerator 100 via the communicator 330.

The communicator 330 may be, for example, connected to a network via a wired communication or a wireless communication, and communicate with an external device. The wireless communication is a cellular communication protocol, which may, for example, use at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). In addition, the wireless communication may, for example, include nearfield communication. The nearfield communication may include, for example, at least one of wireless fidelity (WiFi) direct, Bluetooth, near field communication (NFC) or Zigbee. The wired communication may, for example, include at least one of universal serial bus (USB), high definition multimedia interface (HDMI), recommended standard 232 (RS-232), or plain old telephone service (POTS). The network may include a telecommunications network, for example, at least one of a computer network (e.g., LAN or WAN), the Internet or a telephone network. Meanwhile, at least one of functions of the electronic device 100 and the server 300 described above may be performed using a trained artificial intelligence model. To train and utilize an artificial intelligence model, the electronic device 100 and the server 300 may include an artificial intelligence module.

Figure 8:
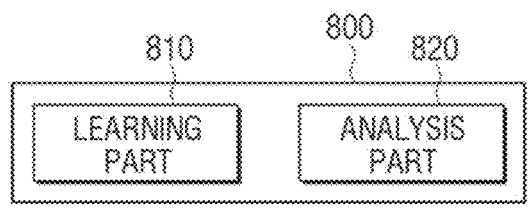
FIG. 8 is a block diagram provided to explain an artificial intelligence module for learning and utilizing an artificial intelligence mode, according to an embodiment of the disclosure.

FIG. 8 is a diagram provided to explain an artificial intelligence module 800 which may be included in the electronic device 100 and the server 300, according to an embodiment of the disclosure. The artificial intelligence module 800 may be included in the memory 120 of the refrigerator 100 and may be executed by the processor 110 of the refrigerator 100. In addition, the artificial intelligence module 800 may be included in the memory 320 of the server 300 and executed by the processor 310 of the server 300.

The artificial intelligence module 800 may include a learning part 810 and an analysis part 820.

The learning part 810 may generate or train an artificial intelligence model using a learning data.

For example, the learning part 810 may provide a model trained to include a standard for identifying (or distinguishing) food in a captured image. As another example, the learning part 810 may provide a model trained to include a standard for identifying food (acquiring a food name) in a captured image. As another example, the learning part 810 may provide a model trained to include a standard for generating an augmented-reality object resembling an object included in the image.

The analysis part 820 may input a data to the trained model and acquire a result data.

For example, the analysis part 820 may input an image captured by the internal camera 152 to the trained model, and acquire a result data in which foods in the image are identified (or distinguished). As another example, the analysis part 820 may input food images to the trained model, and acquire food names of the respective food images. As another example, the analysis part 820 may input an image to the trained model, and acquire an augmented-reality object resembling an object within the image.

At least a part of the learning part 810 or at least a part of the analysis part 820 may be implemented as a software module or manufactured in the form of at least one hardware chip, and mounted on an electronic device. For example, at least one of the learning part 810 or the analysis part 820 may be manufactured in the form of a hardware chip exclusive for artificial intelligence (AI), or may be manufactured as a part of an existing general processor (for example, CPU or application processor) or a processor used exclusively for graphic (for example, GPU), and mounted on the server 300 providing, to the refrigerator 100, the analysis result using the refrigerator 100 or the artificial intelligence model described above. The hardware chip exclusive for artificial intelligence is an exclusive processor specialized for probability calculation, which may show high parallel processing performance as compared with a previous general purpose processor so that calculation operations in the artificial intelligence field such as machine learning may be quickly processed. In a case that the learning part 810 and the analysis part 820 are implemented as a software module (or a program module including instructions), the software module may be stored in non-transitory computer readable media. In this case, the software module may be provided by an operating system (OS) or a predetermined application. Alternatively, a part of the software module may be provided by the OS, and the other portions of the software module may be provided by the predetermined application.

The learning part 810 and the analysis part 820 may be implemented on one electronic device or may be respectively implemented on additional electronic devices. For example, one of the learning part 810 and the analysis part 820 may be included in the refrigerator 100, and the other may be included in the server 300. In addition, the learning part 810 and the analysis part 820 may provide model information constructed by the learning part 810 to the analysis part via a cable or wirelessly, and data input to the learning part 810 may be provided to the learning part 810 as an additional learning data.

Figure 9:
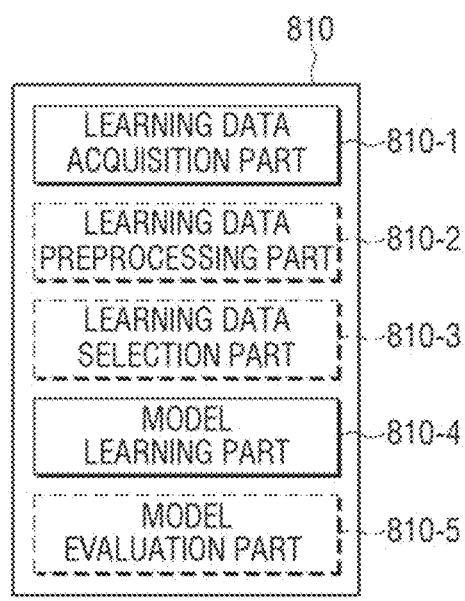
FIG. 9 is a block diagram provided to explain a learning part and analysis part of an artificial intelligence module, according to various embodiments of the disclosure.

FIG. 9 is a block diagram of the learning part 810, according to an embodiment.

Referring to FIG. 9, the learning part 810 according to some embodiments may include a learning data acquisition part 810-1 and a model learning part 810-4. In addition, the learning part 810 may further selectively include a learning data preprocessing part 810-2, a learning data selection part 810-3 or a model evaluation part 810-5.

The learning data acquisition part 810-1 may acquire a learning data to train a model for food identification, food recognition, augmented-reality object generation, etc. described above.

The learning data may be a data collected or tested by the learning part or the manufacturer of the learning part 810.

The model learning part 810-4 may train, using the learning data, a model to include as to how the model is to understand, recognize, perceive, identify and infer an input data. The model learning part 810-4 may train the model through supervised learning that uses at least a part of the learning data as identification criteria. Alternatively, the model learning part 810-4 may, for example, train itself using the learning data without additional supervision so that the model may be trained through unsupervised learning to discover identification criteria for identifying a context. In addition, the model learning part 810-4 may train the model through reinforcement learning that uses feedback as to whether a result of context identification according to learning is correct. In addition, the model learning part 810-4 may, for example, train the model using a learning algorithm including error back-propagation or gradient descent.

In a case that a plurality of pre-constructed recognition model are present, the model learning part 810-4 may identify a model of high relevance to an input learning data and a basic learning data as a model to be trained. In this case, the basic learning data may be pre-classified by the data type, and the model may be pre-constructed by the data type. For example, the basic learning data may be pre-classified based on various criteria such as an area in which the learning data is generated, a time at which the learning data is generated, a size of the learning data, a genre of the learning data, a generator of the learning data and the like.

When the model is trained, the model learning part 810-4 may store the trained model. For example, the model learning part 810-4 may store the trained model in the memory 120 of the refrigerator 100 or the memory 320 of the server 300.

The learning part 810 may further include the learning data preprocessing part 810-2 and the learning data selection part 810-3 to improve the processing capacity of the model or to save resources or time necessary for generating the model.

The learning data preprocessing part 810-2 may preprocess the acquired data so that the acquired data is utilized in learning for context identification. The learning data preprocessing part 810-2 may process the acquired data to a preset format so that the model learning part 810-4 may use the acquired data for learning for context identification.

The learning data selection part 810-3 may select data necessary for learning from among the data acquired by the learning data acquisition part 810-1 and the data preprocessed by the learning data preprocessing part 810-2. The selected learning data may be provided to the model learning part 810-4. The learning data selection part 810-3 may select learning data necessary for learning from among the acquired or processed data according to preset selection criteria. In addition, the learning data selection part 810-3 may select learning data according to preset selection criteria by learning of the model learning part 810-4.

The learning part 810 may further include a model evaluation part 810-5 to improve the processing capacity or efficiency of the model.

The model evaluation part 810-5 may input evaluation data to the model, and when a result output from the evaluation data fails to satisfy predetermined criteria, control the model learning part 810-4 to retrain the model. In this case, the evaluation data may be a predefined data to evaluate the model.

For example, the model evaluation part 810-5 may, if the number of ratio of evaluation data for which the analysis result is inaccurate exceeds a preset threshold from among the analysis result of the trained model for the evaluation data, evaluate that a predetermined criterion is not satisfied.

Meanwhile, when a plurality of trained models are present, the model evaluation part 810-5 may evaluate whether the respective trained models satisfy a predetermined criterion, and identify a model satisfying the predetermined criterion as a final or selected model. In this case, when a plurality of models satisfy the predetermined criterion, the model evaluation part 810-5 may identify any one model or predetermined number of models preset in descending order of evaluation score as a final model.

Figure 10:
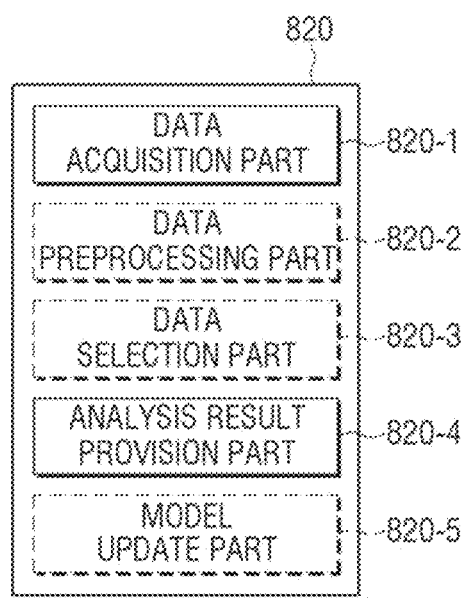
FIG. 10 is a block diagram provided to explain a learning part and analysis part of an artificial intelligence module, according to various embodiments of the disclosure.

FIG. 10 is a block diagram of the analysis part 820, according to an embodiment.

Referring to FIG. 10, the analysis part 820 may include the data acquisition part 820-1 and the analysis result provision part 820-4. In addition, the analysis part 820 may further selectively include the data preprocessing part 820-2, the data selection part 820-3 or the model update part 820-5.

The data acquisition part 820-1 may acquire data necessary for analysis. The analysis result provision part 820-4 may provide a result of inputting the data acquired from the data acquisition part 820-1 to the trained model. The analysis result provision part 820-4 may provide an analysis result according to a purpose of data analysis. The analysis result provision part 820-4 may apply, to the recognition model, data selected by the data preprocessing part 820-2 or the data selection part 820-3 which will be described later, and acquire the analysis result. The analysis result may be identified by the model.

The analysis part 820 may further include the data preprocessing part 820-2 and the data selection part 820-3 to improve an analysis result of the model or save resources or time necessary for providing the analysis result.

The data preprocessing part 820-2 may preprocess the acquired data so that the acquired data is utilized for context determination. The data preprocessing part 820-2 may process the acquired data to a predefined format so that the analysis result provision part 820-4 may use the acquired data.

The data selection part 820-3 may select data necessary for context determination from among the data acquired by the data acquisition part 820-1 or the data preprocessed by the data preprocessing part 820-2. The selected data may be provided to the analysis result provision part 820-4. The data selection part 820-3 may select some or all of the acquired or preprocessed data according to preset selection criteria for context determination. In addition, the data selection part 820-3 may select data according to predetermined selection criteria by learning of the model learning part 810-4.

Figure 11:
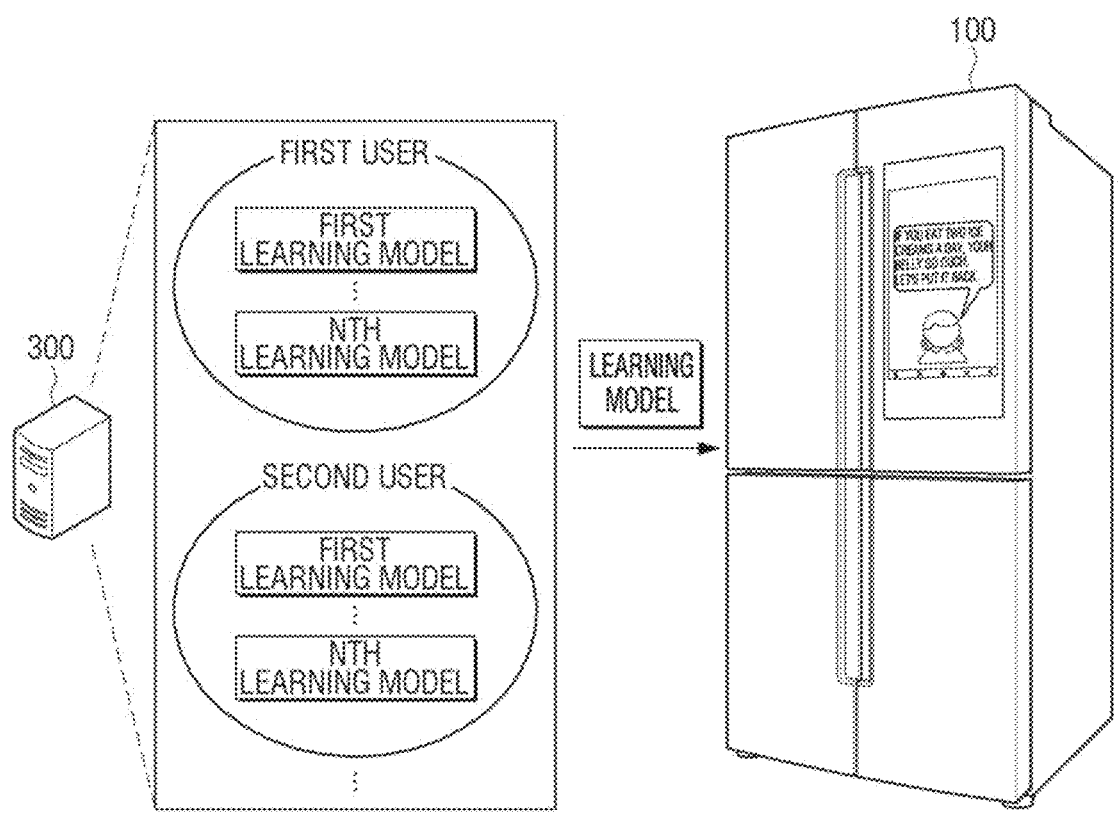
FIG. 11 is a diagram illustrating an embodiment in which a server stores trained models, and a refrigerator downloads the models and executes them.

The model updating part 820-5 may control the model to be updated, based on an evaluation on the analysis result provided from the analysis result provision part 820-4. For example, the model updating part 820-5 may provide the recognition result provided from the analysis result provision part 820-4 to the model learning part 810-4, and thereby request the model learning part 810-4 to further learn or update the model. FIG. 11 is a diagram provided to explain an embodiment in which trained models are stored in the server 300 and downloaded and executed by the refrigerator 100.

Referring to FIG. 11, the server 300 may include models (referred to as learning models) trained to perform food recognition, food recognition, augmented-reality object generation, etc. as described above.

For example, the server 300 may include learning models which are personalized by the user account. That is, models trained based on information on a first user (e.g., information related to the first user interacting with the refrigerator 100 and the mobile device 200) may be registered in an account of the first user, and models trained based on information on a second user (e.g., information related to the second user interacting with the refrigerator 100 and the mobile device 200) may be registered in an account of the second user. The refrigerator 100 may, when a user currently using the refrigerator 100 is recognized as the first user, download a learning model registered in the account of the first user and use the learning model, and when a user currently using the refrigerator 100 is recognized as the second user, download a learning model registered in the account of the second user and use the learning model.

The learning models may be stored in the refrigerator 100. In this case as well, the refrigerator 100 may store the personalized learning models for each user.

Meanwhile, the refrigerator 100 may a personal secretary program (e.g., Bixby) which is an artificial intelligence exclusive program (or artificial intelligence agent). The personal secretary program is a program exclusive for providing artificial intelligence (AI)-based services. For artificial intelligence processing, a previous general processor (e.g., CPU) or a single purpose processor (e.g., GPU, FPGA, ASIC, and the like) may be used. The refrigerator 100 may include a plurality of processors, which may include, for example, an AI-exclusive processor and a processor handling other processing. The processor 110 may be a processor for AI processing.

According to an embodiment, when a preset user input (for example, a touch of an icon corresponding to a personal secretary chatbot, a user voice including a preset word, etc.) or a button provided in the refrigerator 100 (for example, a button for executing an artificial intelligence agent) is pressed, an artificial intelligence agent may be operated (or executed). Alternatively, the artificial intelligence agent may be in a standby state before a preset user input is detected or a button provided in the refrigerator 100 is selected. The standby state may be a state in which reception of a predefined user input (for example, a user voice including a preset keyword (e.g., Bixby) is input) to control a start of operation of the artificial intelligence agent is detected. While the artificial intelligence agent is in a standby state, when a preset user input is detected or a button provided in the refrigerator 100 is selected, the refrigerator 100 may operate the artificial intelligence agent. In addition, the artificial intelligence agent may, when a user voice is acquired, perform a function of the refrigerator 100 based on the voice, and when the voice is a query voice, output a response.

According to the various embodiments of the disclosure, the refrigerator 100 may include a microphone and a speaker, and provide a dialogue service to the user using an artificial intelligence agent, and perform various functions including managing food in the refrigerator 100, providing user-customized information, etc. using the artificial intelligence agent.

According to the various embodiments of the disclosure, the refrigerator 100 may provide various services based on an augmented-reality object.

Figure 17:
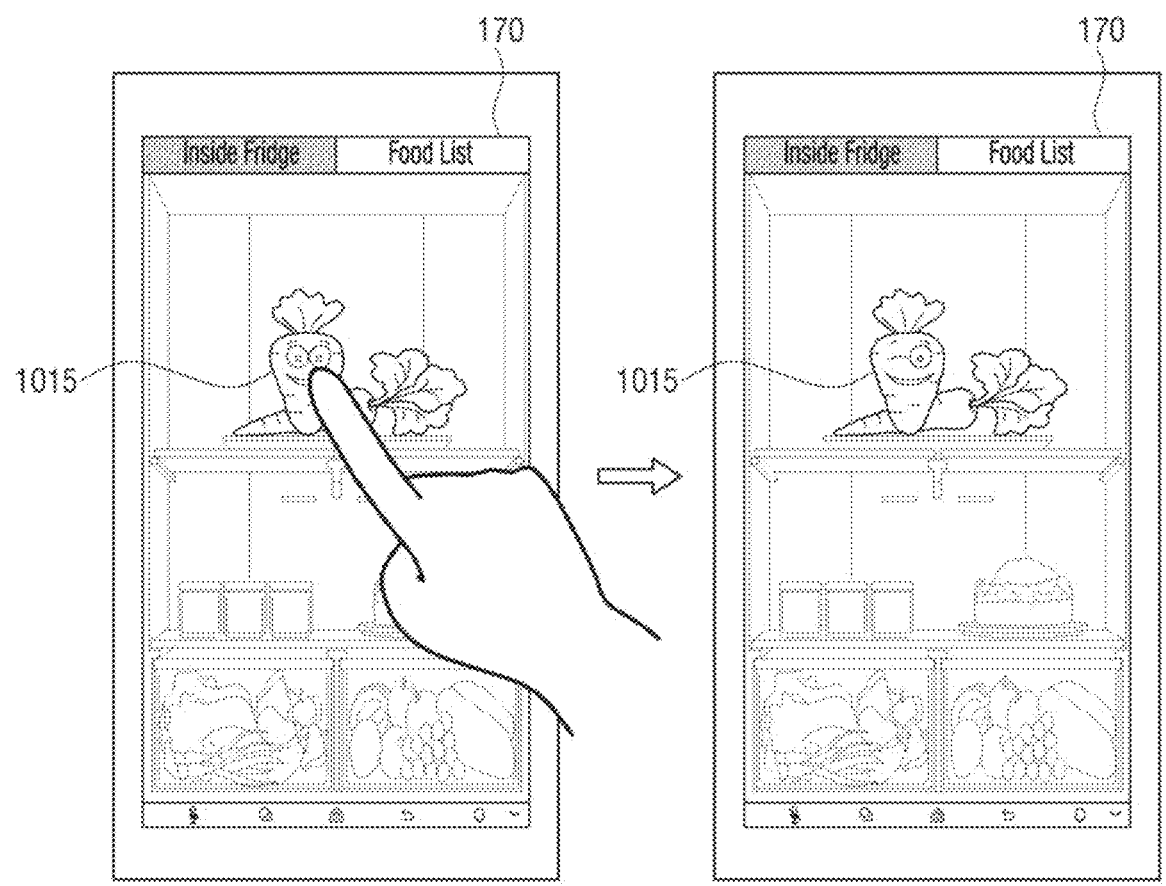
FIG. 17 is a diagram illustrating an embodiment in which an augmented reality object is changed according to interaction with a user.

FIG. 17 is a diagram provided to explain an embodiment in which an augmented-reality object reacting according to a user touch is provided.

Referring to FIG. 17, in a case that the display 170 is implemented as a touch screen, when the user touches the augmented-reality object 1015, the augmented-reality object 1015 of which a shape is changed according to the touch may be displayed on the display 170.

According to another embodiment of the disclosure, while an augmented-reality object is displayed, when a user input is acquired, a response corresponding to the user input may be provided based on the augmented-reality object. The user input may be touching an augmented-reality object displayed on the display 170 implemented as a touch screen, calling the name of the augmented-reality object, or uttering a speech saying what the user wants.

The augmented-reality object may provide a response corresponding to the user input with a text and/or sound. For example, a response in the form of a speech bubble may be provided next to the augmented-reality object, and a response voice may be provided via the speaker 130.

The processor 110 may, when a user input is acquired while the augmented-reality object is displayed, provide a response corresponding to the user input based on the augmented-reality object.

Figure 18:
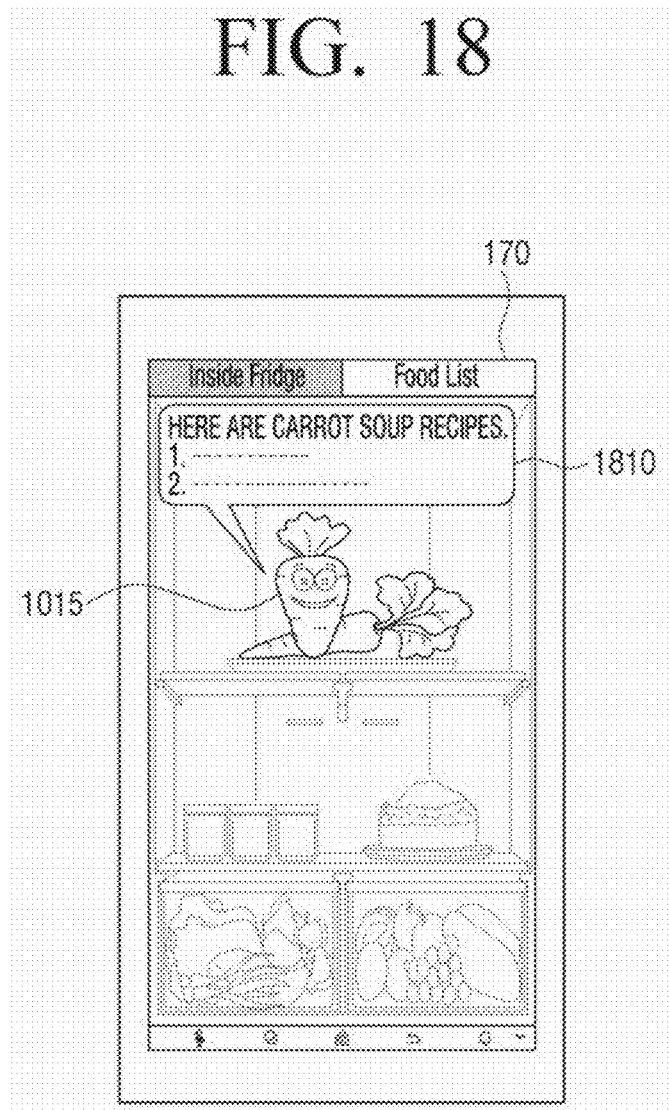
FIG. 18 is a diagram provided to explain a recipe provision of a refrigerator, according to an embodiment of the disclosure.

FIG. 18 is a diagram provided to explain an embodiment in which a recipe is provided based on an augmented-reality object.

Referring to FIG. 18, a user input acquired while the augmented-reality object 1015 is displayed is related to a recipe request, provide a recipe of which an ingredient is a food corresponding to the augmented-reality object 1015 based on the augmented-reality object 1015. A recipe of dish that can be cooked with foods in the refrigerator 100 other than the food corresponding to the augmented-reality object 1015 may also be provided through the augmented-reality object 1015.

The processor 110 may, when a user voice is acquired via the microphone 140 while the augmented-reality object 1015 is displayed, control the display 170 to display a shape in which the augmented-reality object 1015 provides a response corresponding to the user voice, and control the speaker 130 to output a voice corresponding to the response.

For example, when the user utters a speech "recommend recipe", the uttered speech may be acquired via the microphone 140, a recipe 1810 that can be cooked with a food corresponding to the augmented-reality object 1015 may be provided on the display 170, and a voice informing the recipe may be output from the speaker 130. In addition, an effect in which the mouth of the augmented-reality object 1015 moves as if the augmented-reality object 1015 were saying the recipe may be displayed.

Meanwhile, a response may also be provided as a touch command as well as a voice command. For example, when the user touches the augmented-reality object 1015, the processor 110 may provide a recipe based on the augmented-reality object 1015.

Meanwhile, the augmented-reality object may automatically move even in the absence of user input. That is, an effect in which the augmented-reality object freely moves around in the refrigerator may be displayed. This effect may be shown in a standby state in which a command is not acquired from the user.

According to another embodiment of the disclosure, information on a state of food may be provided based on the augmented-reality object. An embodiment is described with reference to FIG. 19.

Figure 19:
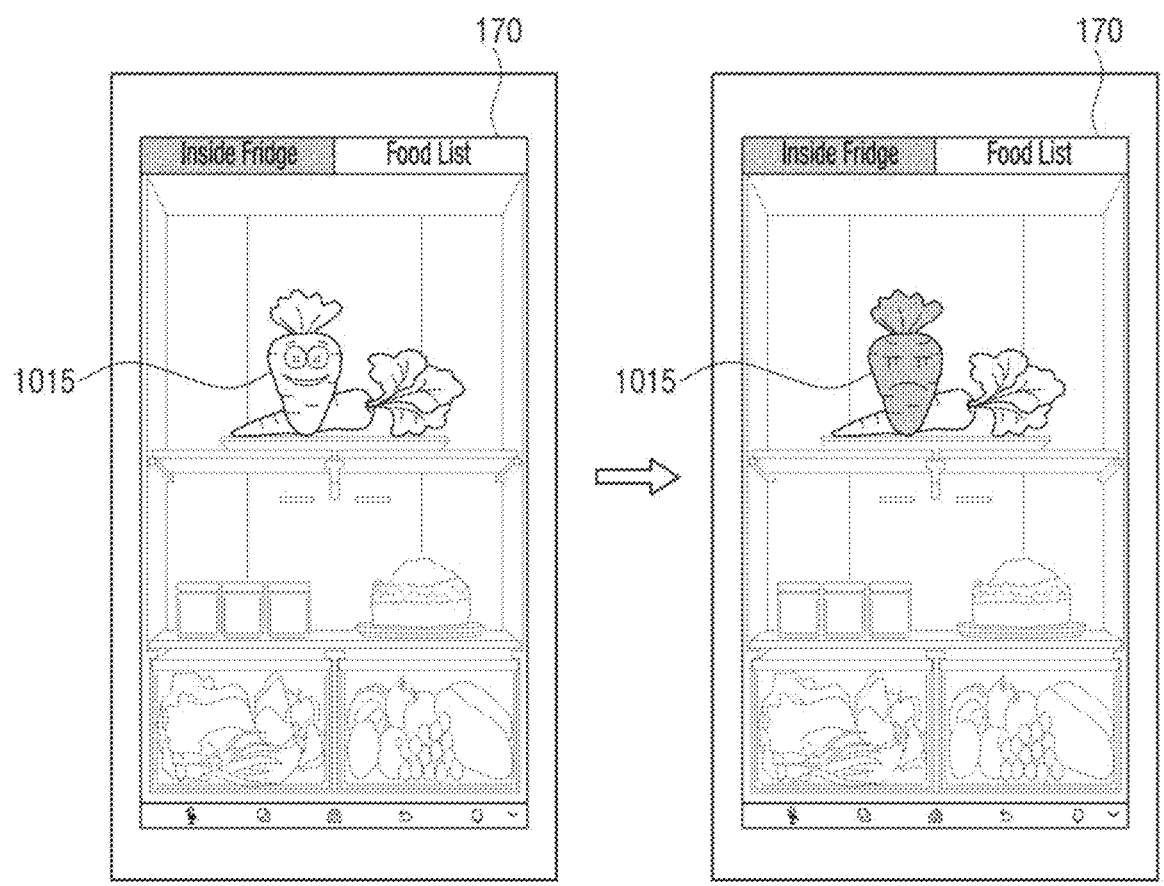
FIG. 19 is a diagram provided to explain provision of shelf life information by a refrigerator, according to an embodiment of the disclosure.

Referring to FIG. 19, the processor 110 may, based on shelf life information of food stored in the memory 120, control the display 170 to change a shape of the augmented-reality object 1015 according to a period for which the food has been stored in the refrigerator 100 and display the period.

For example, the processor 110 may change a shape of the augmented-reality object 1015 based on a difference between the shelf life of food stored in the memory 120 and a current date. That is, the augmented-reality object 1015 corresponding to food may be changed with the elapse of storage time of the food.

For example, the augmented-reality object 1015 may gradually wither. Alternatively, a facial expression of the augmented-reality object 1015 may be gradually changed to being upset. Alternatively, wrinkles or a white beard may appear on the augmented reality object 1015. Then, when a shelf life of food has elapsed, the augmented-reality object 1015 may be changed to an inedible form. For example, the augmented-reality object 1015 may be in a trash can.

According to the embodiment described above, an effect that a state of food can be intuitively identified by looking at an augmented-reality object can be obtained.

Figure 20:
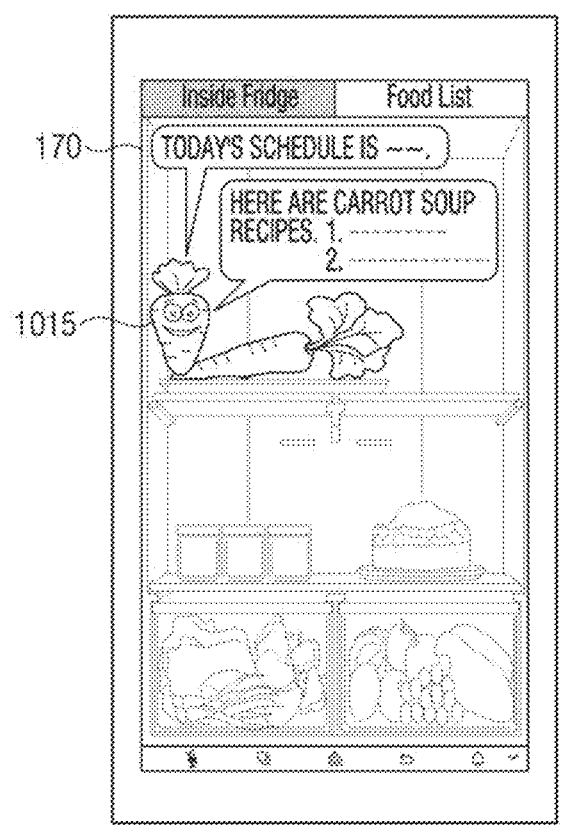
FIG. 20 is a diagram illustrating an embodiment in which a response is provided through an augmented reality object.

The refrigerator 100 may graft an artificial intelligence agent onto an augmented-reality object. That is, the artificial intelligence agent may answer the user response based on the augmented-reality object and provide information to the user. When an augmented-reality object corresponding to food is used, the specificity of kitchen may be reflected. For example, as illustrated in FIG. 20, a response provided by an artificial intelligence agent may be provided through the augmented-reality object 1015 corresponding to food in the refrigerator 100. The information that can be provided may be, for example, information specialized for refrigerators such as a recipe, or may be other various information such as schedule management information.

According to another embodiment of the disclosure, various applications may be executed through an interaction with an augmented-reality object. This will be described with reference to FIG. 21.

Figure 21:
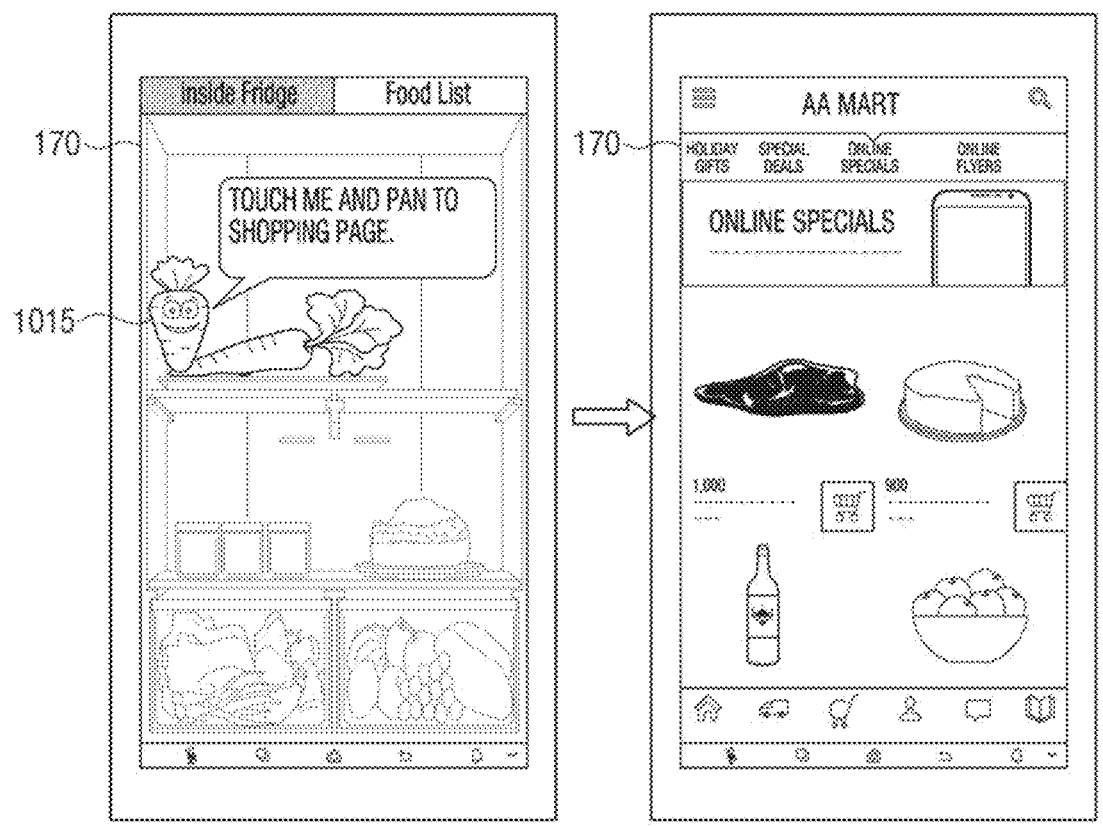
FIG. 21 is a diagram illustrating an embodiment in which a page switch to a shopping website is made using an augmented reality object.

FIG. 21 is a diagram provided to explain an embodiment in which, when a user input to select an augmented-reality object is present, a web browser application is executed and a product shopping website is linked.

Referring to FIG. 21, a user input to touch the augmented-reality object 1015 displayed on the display 170 implemented as a touch screen is present, the processor 110 may execute a web browser application and display a grocery shopping website on the display 170.

According to an embodiment, a food purchase may be induced based on the augmented-reality object 1510. For example, the processor 110 may control the display 170 to display an augmented-reality object displaying a message inducing purchase of food that has been stored in the refrigerator 100 but not currently stored in the refrigerator 100. Alternatively, the processor 110 may control the display 170 to display an augmented-reality object 1510 displaying a message inducing purchase of food that is appropriate for a current weather based on weather information. Alternatively, the processor 110 may control the display 170 to display an augmented-reality object 1510 displaying a message inducing purchase of food that is used in a recipe frequently selected by the user but not currently stored in the refrigerator 100.

The refrigerator 100 may a user-customized service. That is, different information may be provided for each user rather than uniform information. For example, different augmented-reality objects may be provided for each user.

To provide this user-customized service, the refrigerator 100 may provide a function of setting a user profile.

FIGS. 22 to 29 are diagrams provided to explain an example process of setting a user profile in the refrigerator 100. This user profile setting process may be performed through the mobile device 200 as well.

Figure 22:
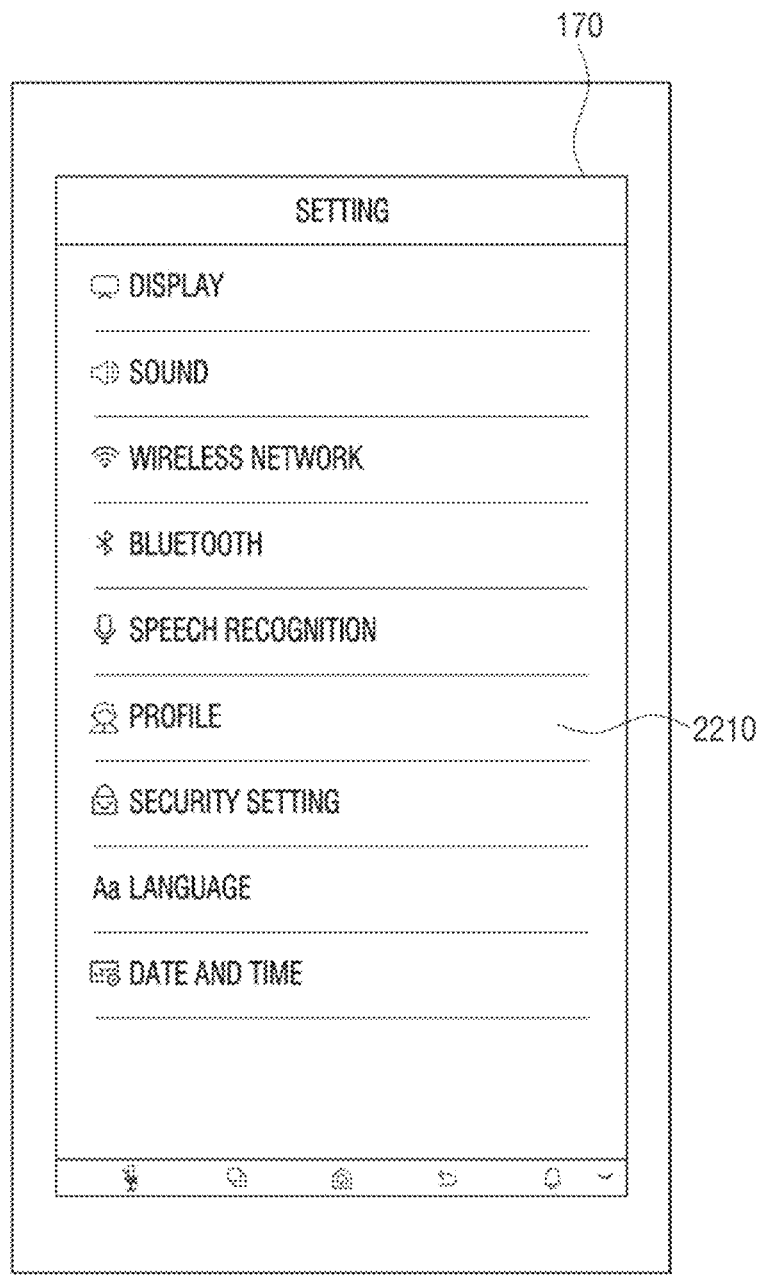
FIG. 22 is a diagram illustrating a user interface (UI) for user profile setting, according to various embodiments of the disclosure.
Figure 23:
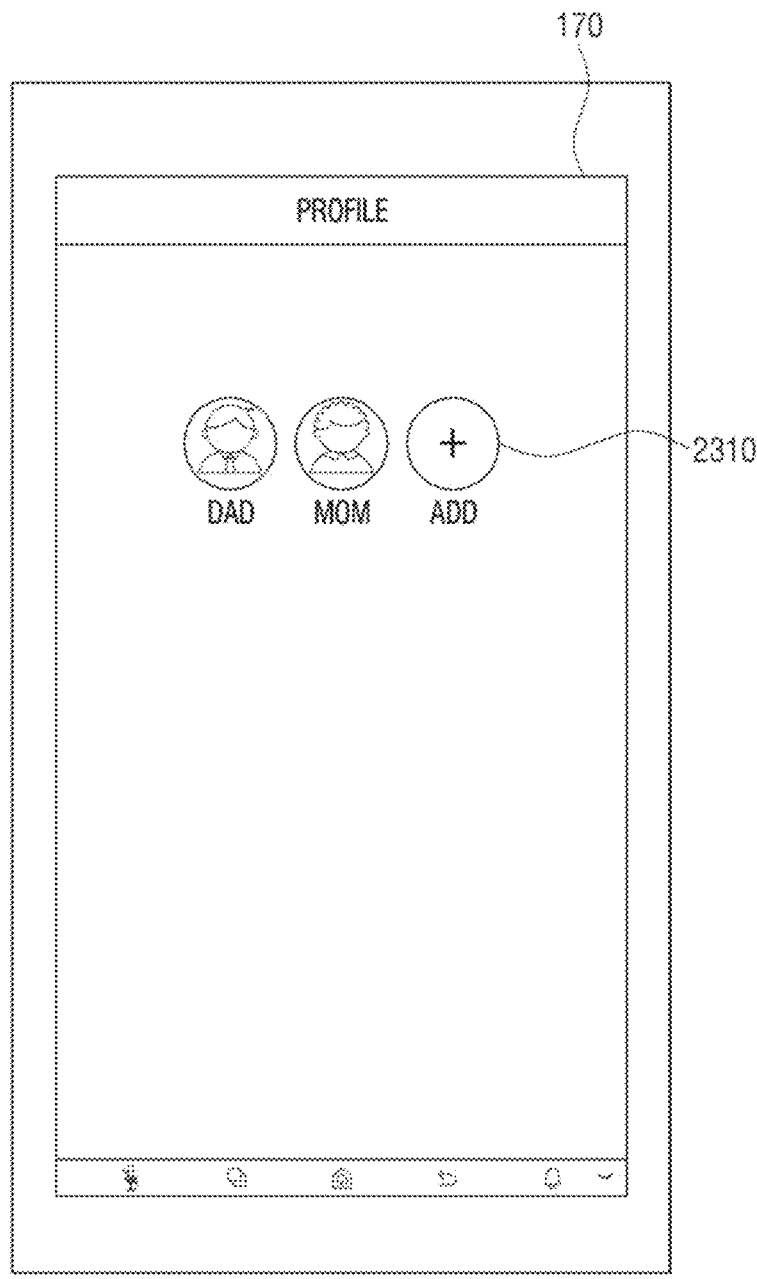
FIG. 23 is a diagram illustrating a user interface (UI) for user profile setting, according to various embodiments of the disclosure.
Figure 24:
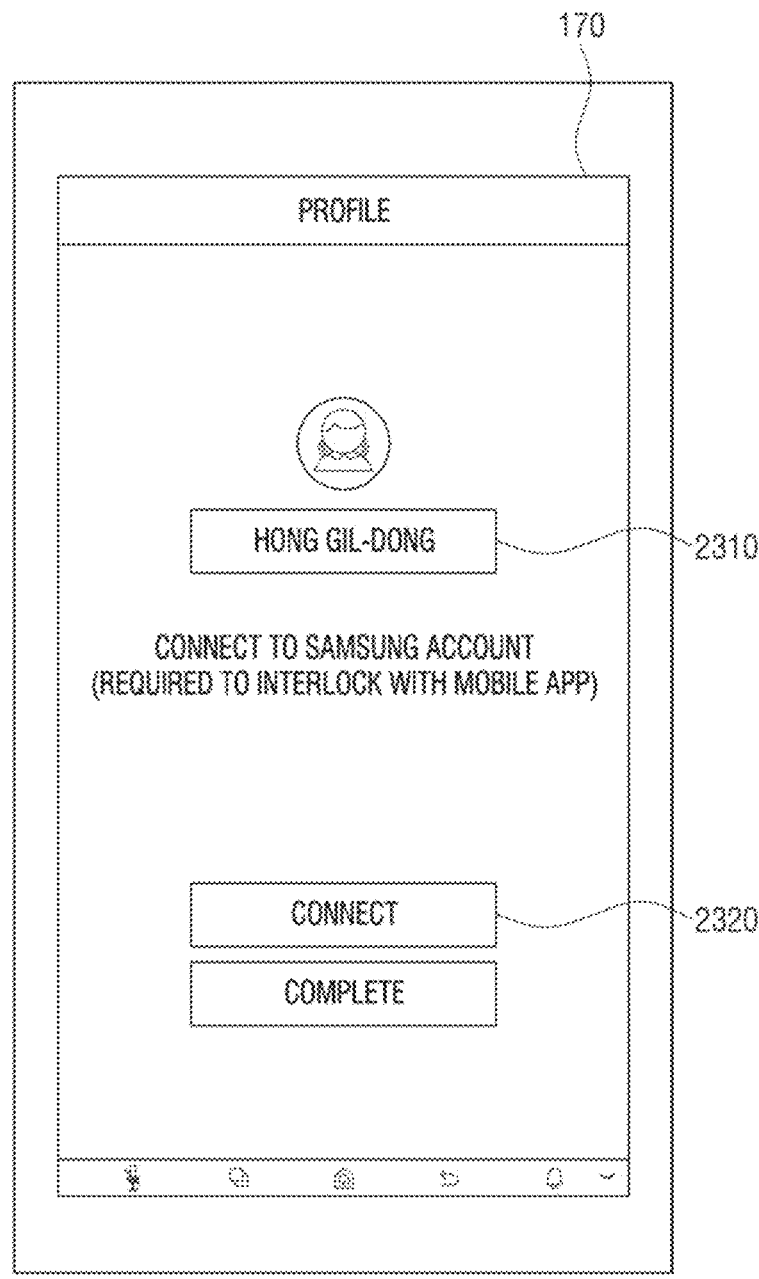
FIG. 24 is a diagram illustrating a user interface (UI) for user profile setting, according to various embodiments of the disclosure.
Figure 25:
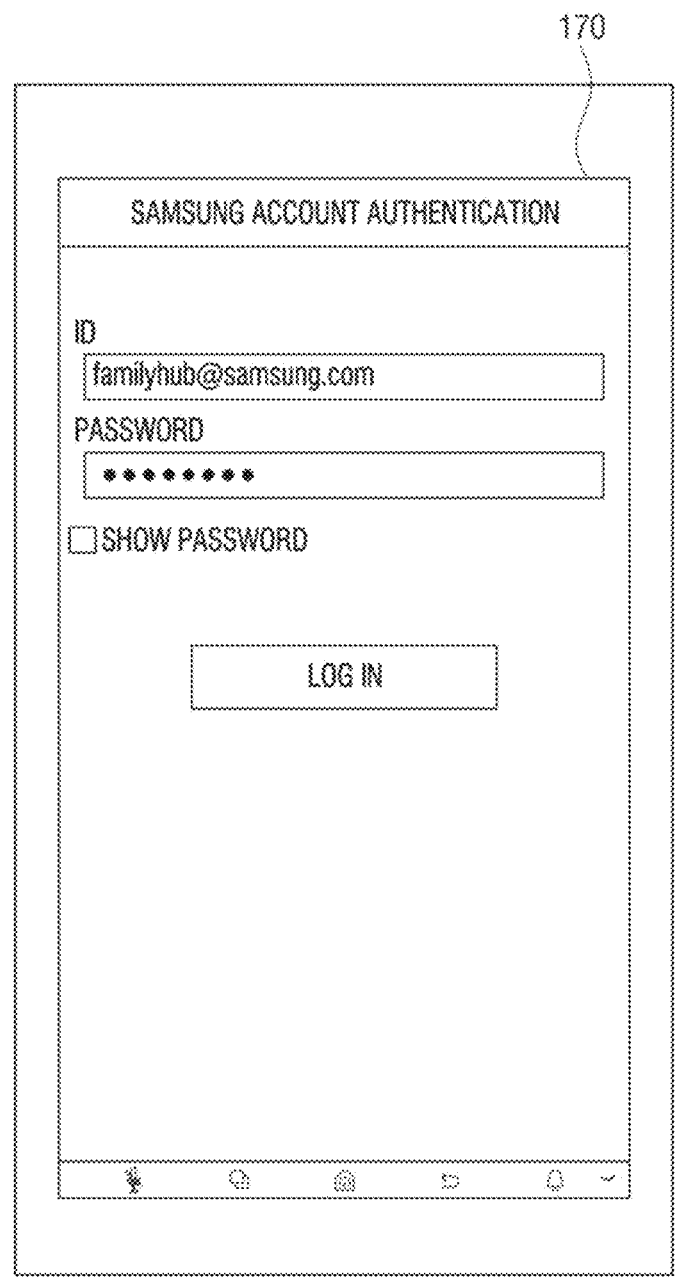
FIG. 25 is a diagram illustrating a user interface (UI) for user profile setting, according to various embodiments of the disclosure.
Figure 26:
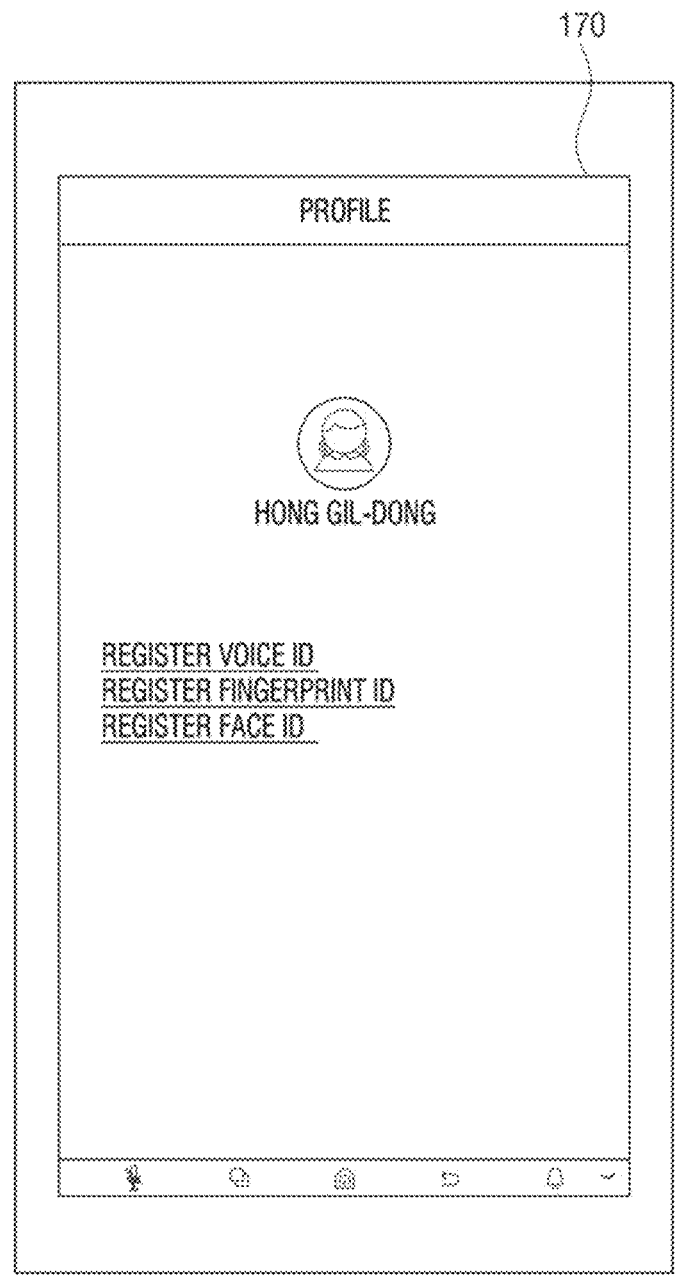
FIG. 26 is a diagram illustrating a user interface (UI) for user profile setting, according to various embodiments of the disclosure.

Referring to FIG. 22, the processor 110 may control the display 170 to display a setting user interface (UI). When a profile setting UI element 2210 is selected, as illustrated in FIG. 23, the processor 110 may control the display 170 to display a user interface (UI) for adding profiles. When an addition UI element 2310 is selected, the processor 110 may, as illustrated in FIG. 24, designate a name, and control the display 170 to display a UI for logging into the account. A user may input his or her name to the name input field 2310. In addition, when a connection UI element is selected, the processor 110 may display a UI for logging into the account, as illustrated in FIG. 25. When the account login is completed, the user may set various login methods as illustrated in FIG. 26. In addition, the processor 110 may provide a setting UI for augmented reality service. The augmented-reality service includes various services based on an augmented-reality object as described above.

Figure 27:
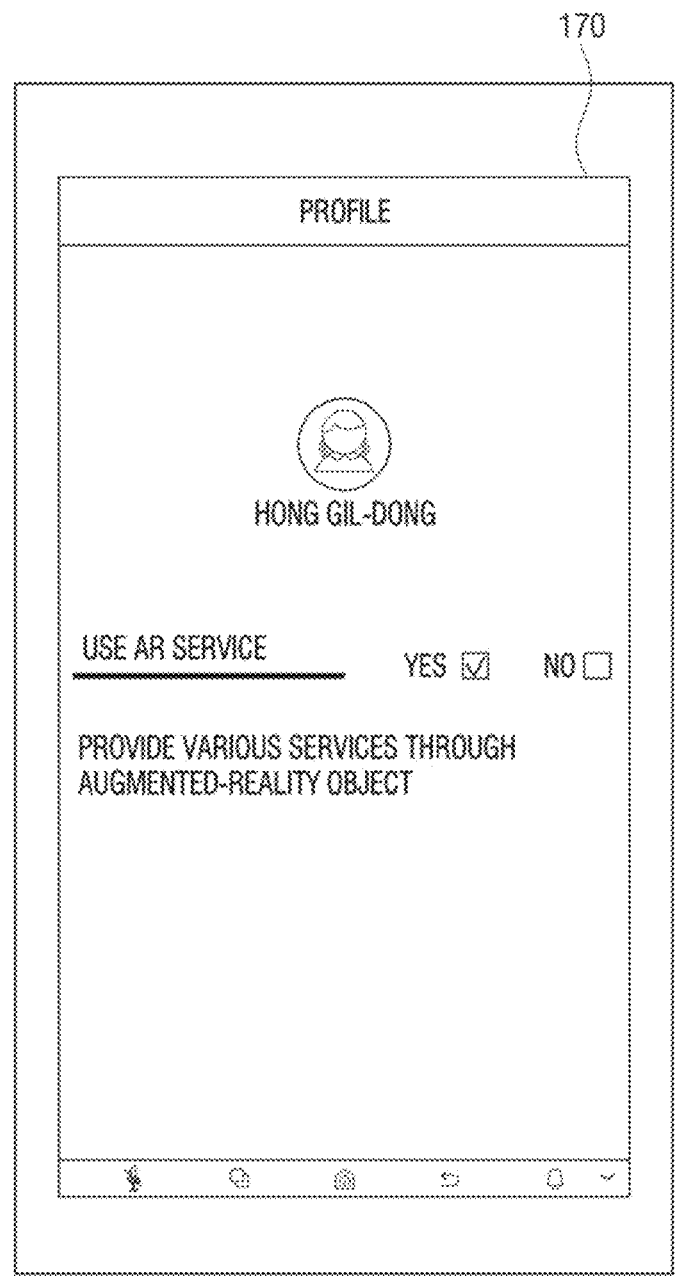
FIG. 27 is a diagram illustrating a user interface (UI) for user profile setting, according to various embodiments of the disclosure.
Figure 28:
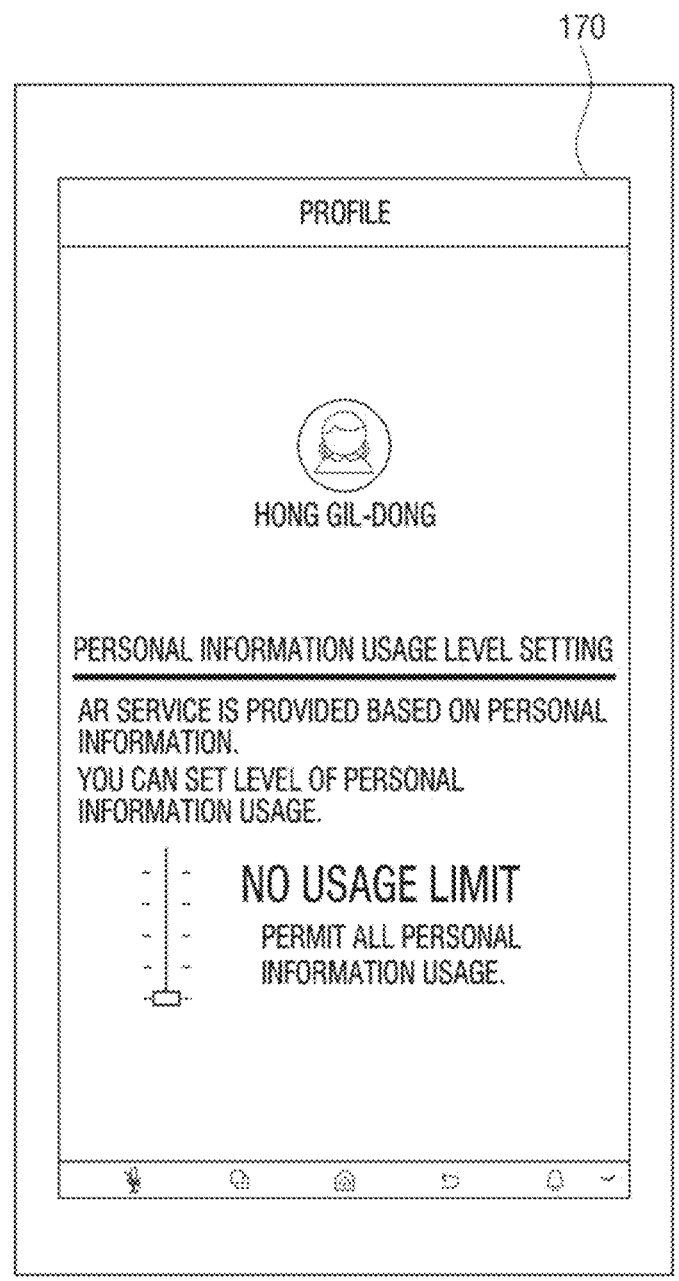
FIG. 28 is a diagram illustrating a user interface (UI) for user profile setting, according to various embodiments of the disclosure.
Figure 29:
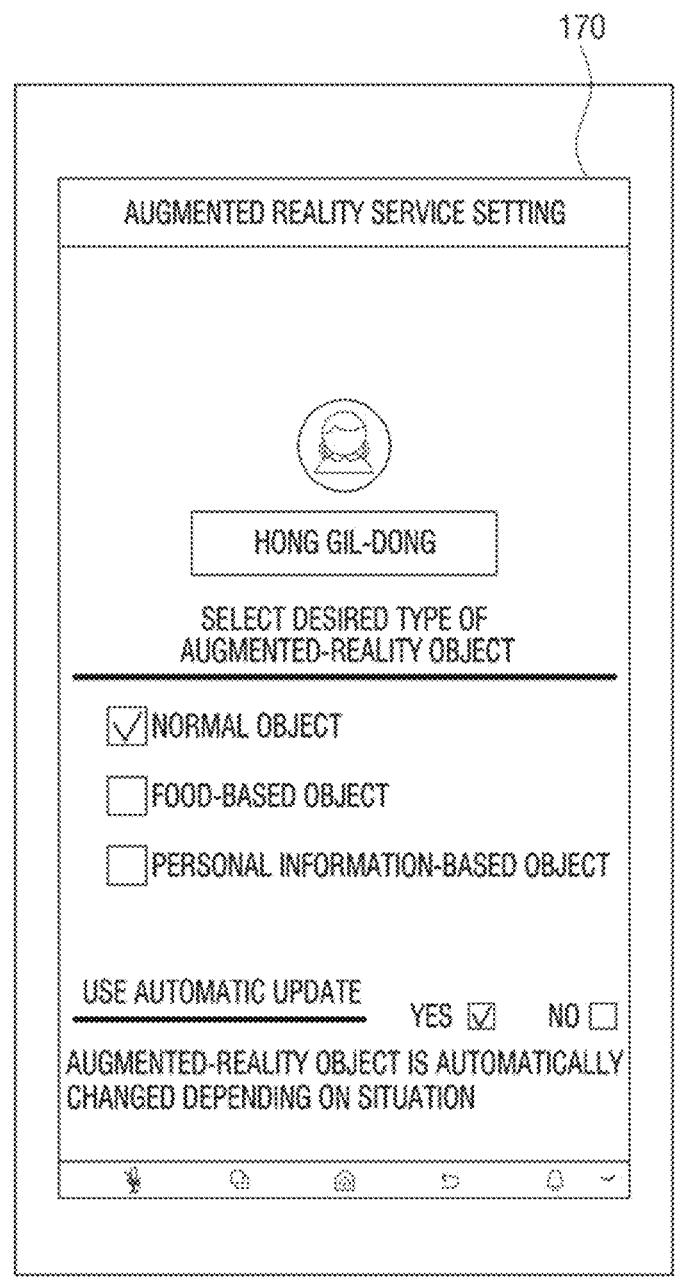
FIG. 29 is a diagram illustrating a user interface (UI) for user profile setting, according to various embodiments of the disclosure.

FIGS. 27 to 29 are diagrams provided to explain an augmented reality service setting user interface (UI), according to various embodiments of the disclosure.

Referring to FIG. 27, the processor 110 may control the display 170 to display a user interface (UI) setting whether to use an augmented reality service. On the user interface, the user may select whether to use an augmented reality service. That is, even when the same refrigerator 100 is used, the augmented reality service may or may not be provided depending on the recognized user.

When the user selects to use the augmented reality service, a UI as shown in FIG. 28 may be provided. Referring to FIG. 28, the processor 110 may control the display 170 to display a user interface (UI) setting usage of personal information in the augmented reality service. Various levels of personal information may be utilized in the augmented reality service. For example, social network service (SNS) account information, information generated while the user uses the refrigerator 100 (e.g., preferred recipe, cooking skill level, search history, etc.), etc. may be used, and through the UI as shown in FIG. 28, the user may designate the level of usage of the information. Only information of the designated level may be transferred to the server 300 and processed.

Referring to FIG. 29, the processor 110 may control the display 170 to display a user interface (UI) for selecting a type of augmented-reality object. When a normal object is selected, an augmented-reality object of a predetermined shape may be provided. When a food-based object is selected, an augmented-reality object resembling food in the refrigerator 100 may be provided. When a personal information-based object is selected, an augmented-reality object associated with the user, for example, an object resembling the user face or an object appropriate for the user age, occupation and personality, may be provided.

In addition, referring to FIG. 29, the user may select whether to use automatic update, and when the automatic update is selected, the augmented-reality object may be automatically changed according to circumstances. For example, the augmented-reality object may provide a recipe. When the user has a low level of cooking skill, an augmented-reality object suggestive of an ordinary person may be provided, and when the user has a high level of cooking skill, an augmented-reality object suggestive of a professional chef may be provided.

As described above, through the artificial intelligence service setting UI, when the refrigerator 100 is used by multiple users, the users may be provided with a service customized for each user.

After an augmented reality service setting is completed, the refrigerator 100 may recognize a current user, and provide a service according to information set for the recognized user.

Figure 30:
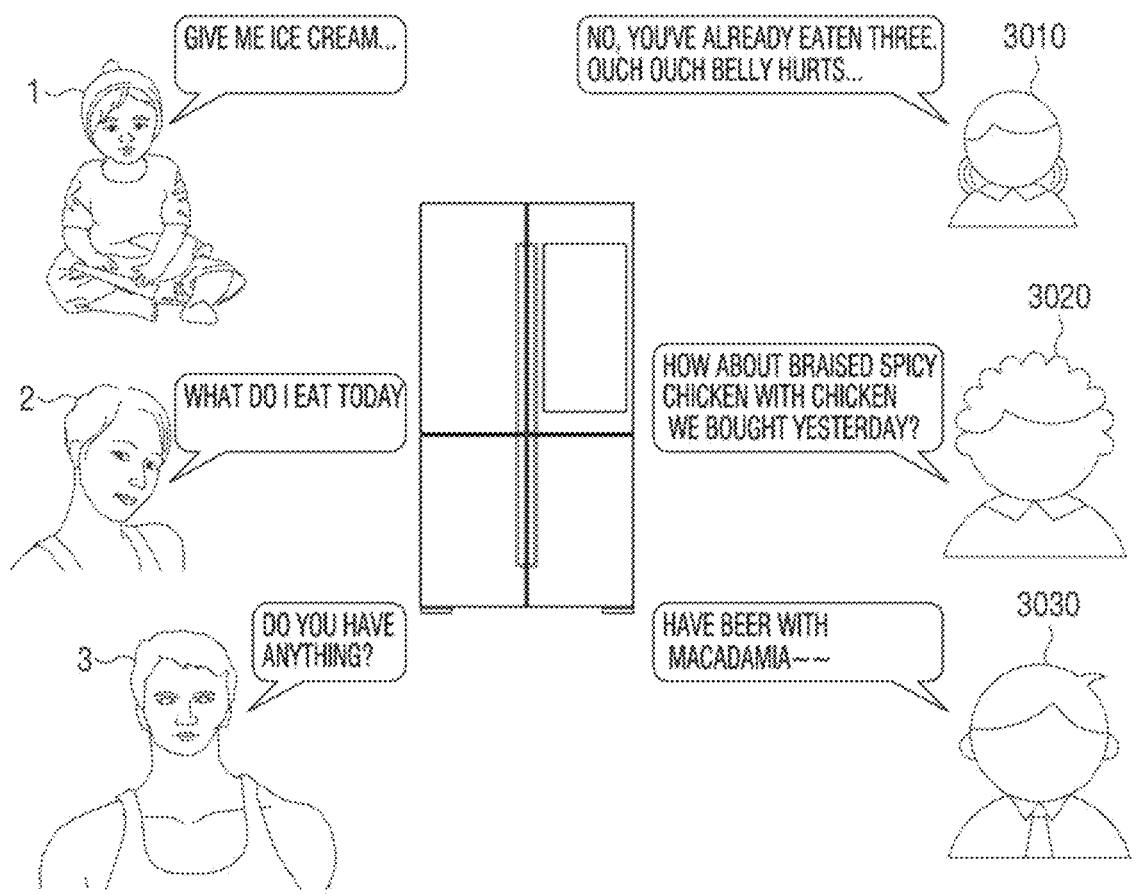
FIG. 30 is a diagram illustrating a refrigerator providing a user-customized augmented reality object.

FIG. 30 is a diagram provided to explain embodiments in which an augmented reality service is provided according to a type of augmented-reality object set for each user.

Referring to FIG. 30, the processor 110 may acquire a first augmented-reality object 3010 corresponding to a first user 1, a second augmented-reality object 3020 corresponding to a second user 2, and a third augmented-reality object 3030 corresponding to a third user 3. For example, the processor 110 may, as illustrated in FIG. 29, acquire an augmented-reality object corresponding to a type designated for each user. Alternatively, the processor 110 may acquire an augmented-reality object based on user feature information (age, etc.) of the user or acquire an augmented-reality object appropriate for a current function (for example, for a recipe recommendation function, an augmented reality object of a chef shape).

In addition, the processor 110 may provide a response corresponding to an input of each user based on the acquired augmented-reality object. That is, an augmented-reality object of different types may be provided for each user. For example, as illustrated in FIG. 30, when the first user 1 utters a speech, the processor 110 may recognize the first user 1, and provide a response to the speech based on the first augmented-reality object 3010 corresponding to the first user 1. When the second user 2 utters a speech, the processor 110 may recognize the second user 2, and provide a response to the speech based on the second augmented-reality object 3020 corresponding to the second user 2. When the third user 3 utters a speech, the processor 110 may recognize the third user 3, and provide a response to the speech based on the third augmented-reality object 3030 corresponding to the third user 3.

The refrigerator 100 may, as described above, recognize a user through a fingerprint recognition method, a face recognition method, a voice recognition method, etc. Biometric information such as a face, voice and the like of the user may be not only used to recognize the user but also used to acquire user feature information (for example, gender and age of the user). For example, an algorithm roughly estimating an age and gender by face or voice may be used. The processor 110 may acquire information on the age and gender of the user based on the user face captured by the internal camera 151, and acquire information on the age and gender of the user based on the user voice acquired via the microphone 140. The acquired user feature information may be stored in the memory 120.

In addition, the refrigerator 100 may store profile information of the user in the memory 120. The user profile information may include, as described with reference to FIGS. 22 to 29, information set by the user, and further include food intake history information (for example, information on when the user ate food), dietary information (for example, allergic component, body weight and BMI), and information on the level of cooking skill of the user.

The processor 110 may provide the food intake history information based on detecting of the user taking out food from the refrigerator 100.

For example, the processor 110 may, when the user is identified through the fingerprint sensor 163 of the refrigerator handle, a door open of the refrigerator 100 is detected, and food is identified through an image captured by the internal camera 152 or a pressure change detected by the pressure sensor 164 of the shelf that a carrot in the storage room of the refrigerator is disappeared, identify that the identified user has eaten the carrot, and add the carrot to the food intake history information of the identified user. In this case, information on the intake time may be added to the food intake history information.

Alternatively, the user may also input information on the food the user ate through the input interface 175 or the microphone 140 of the refrigerator 100.

Figure 31:
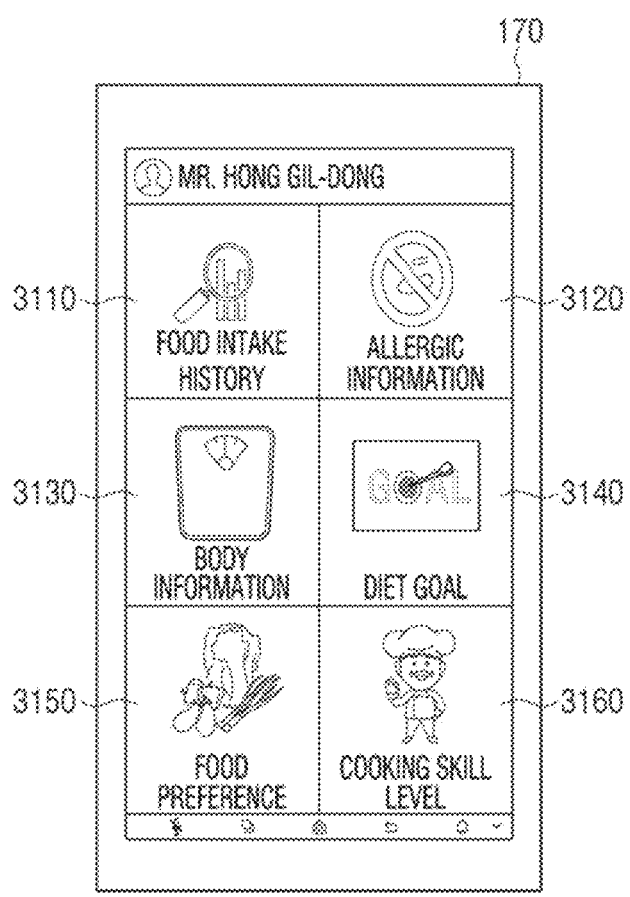
FIG. 31 is a diagram illustrating a user interface (UI) for inputting user profile information.

According to an embodiment, the refrigerator 100 may provide a user interface (UI) for inputting user profile information to the display 170, and provide dietary information for the user based on information input through the UI. Before the UI is provided, a procedure for identifying the user may be performed. For example, the processor 110 may control the display 170 to display a UI inducing input of user identification information (for example, a UI including a message of "touch your finger on the fingerprint sensor on the handle"), and when the user is identified through the fingerprint sensor 163, control the display 170 to display a UI for inputting user profile information. FIG. 31 illustrates an example user interface (UI) for inputting user profile information.

Referring to FIG. 31, a user interface (UI) for inputting user profile information provided on the display 170 may be a UI for inputting information specialized for the user. The UI for inputting the user profile information may include a UI element for inputting an allergic component 3120, a UI element for inputting body information such as a current body weight and the like 3130, a UI element for inputting a diet goal 3140, a UI element for inputting a preferred food 3150, and a cooking skill level UI element 3160.

The user may select the UI element for inputting the allergic component 3120, and input a component to which he or she is allergic (e.g., peach, peanut, etc.), and the processor 110 may add the input detail to the user profile information.

The user may select the UI element for inputting the body information such as a current weight and the like 3130, and input his or her body weight, body mass index (BMI), etc., and the processor 110 may add the input detail to the user profile information.

The user may select the UI element for inputting the body information such as a current weight and the like 3140, and input a target weight, a target BMI, food to be avoided, food to eat, etc., and the processor 110 may add the input detail to the user profile information.

The user may select the UI element for inputting the preferred food 3150, and input his or her favorite food type, food ingredient, recipe, etc., and the processor 110 may add the input detail to the user profile information.

The user may select the cooking skill level UI element 3160 and input their cooking skill level. The cooking skill level may be, for example, set as high, intermediate and low.

The set cooking skill level may be added to the user profile information. When a cooking skill level is not separately set, it may be set to a default value, for example, 'low'. The cooking skill level may be upgraded when cooking is completed as in a recipe provided by the refrigerator 100.

When the food intake history UI element 3110 is selected, the food intake history information of the user may be provided on the display 170. For example, information regarding what food is eaten and when may be organized in a list or statistically and provided.

The user profile information may be also input from an external device and transmitted to the refrigerator 100. For example, the refrigerator 100 may acquire the profile information from the mobile device 200 in which the user profile information is stored via a communication such as near field communication (NFC), Bluetooth and the like, and store the acquired profile information in the memory 120.

The refrigerator 100 may provide information to the user in various methods based on the information on the food included in the refrigerator 100 and the user information. In particular, the refrigerator 100 may provide the information intuitively and bidirectionally, rather than just text-oriented simple information. In addition, user-customized information may be provided.

The refrigerator 100 may provide various information based on an augmented-reality object. At a display time point of an augmented-reality object, for example, when a user is identified and a new food is detected in the refrigerator 100, the processor 110 may control the display 170 to display an augmented-reality object corresponding to the new food.

Alternatively, while an image of inside storage room captured by the internal camera 152 is displayed on the display 170 implemented as a touch screen, when the user touches an area in which a specific food is displayed, the processor 110 may control the display 170 to display an augmented-reality object corresponding to a food displayed in the touched area.

Besides the touch manipulation, when a command to select a specific food inside the storage room by voice is acquired through the microphone 140, an augmented-reality object corresponding to the corresponding food may be displayed on the display 170.

Alternatively, when the user requests food recommendation (for example, when the user inputs a request for food recommendation through the input interface 175 or a voice requesting food recommendation (for example, "Something to eat?) is acquired through the microphone 140), the display 170 may display an augmented-reality object corresponding to recommended food from among the foods inside the refrigerator 100. The recommended food may be determined based on the user profile information.

According to another embodiment, the processor 110 may acquire an augmented-reality object based on the user feature information or the user profile information. For example, the processor 110 may, when it is identified from the user feature information that the user is a girl under 10 years of age, acquire an augmented-reality object of a cartoon character shape which is popular with girls under 10 years of age. As another example, when it is identified from the user profile information that the user is on a diet, an augmented-reality object of a shape of a model having a good figure. In the embodiment, an artificial intelligence model may be used.

According to another embodiment, the profile information may include information on an augmented-reality object preset by the user, and the processor 110 may, when the user is recognized, provide the augmented-reality object preset by the user.

Meanwhile, the processor 110 may, when the user is identified through fingerprint recognition, voice recognition, etc., provide various information based on user feature information (age, etc.) and user profile information of the identified user.

According to an embodiment, the processor 110 may control the display 170 to distinguishably display food that is necessary for the user and food unnecessary for the user, within an image captured by the internal camera 152 based on the information described above.

For example, for the food necessary for the user, an augmented-reality object corresponding to the food may have a happy face, and for the food unnecessary for the user, an augmented-reality object corresponding to the food may have a grim face or angry face. Alternatively, the foods may be distinguished by text or by an additional UI element (for example, applying a green outline onto the food necessary for the user, and applying a red outline onto the food unnecessary for the user).

Figure 32:
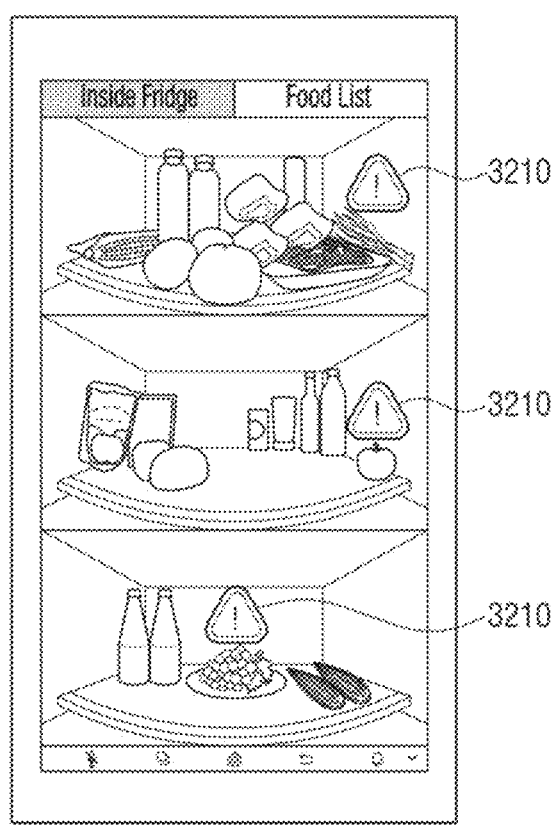
FIG. 32 is a diagram provided to explain provision of allergy information by a refrigerator, according to an embodiment of the disclosure.

FIG. 32 is a diagram provided to explain an embodiment in which allergic food information is provided to a user.

Referring to FIG. 32, the processor 110 may, when a user is identified through fingerprint recognition, voice recognition, etc., control the display 170 to display the UI element 3210 to identify food that induces allergy in the user in the image captured by the internal camera 152 based on allergic component information included in the identified user profile information. For example, the UI element 3210 may be an image indicating attention. This is only an example, and other methods are possible.

As another example, an augmented-reality object corresponding to food to which the identified user is allergic and an augmented-reality object corresponding to food to which the identified user is not allergic may be displayed as being distinguished from each other. For example, the augmented-reality object corresponding to the food to which the identified user is allergic may be a shape in which eyes and lips are swollen, and the augmented-reality object corresponding to the food to which the identified user is not allergic may be a normal shape.

As another example, the processor 110 may control the display 170 to display a text of "allergy warning" on food that causes allergy in the image captured by the internal camera 152.

According to the user profile information, when the user is on a diet, the processor 110 may control the display 170 to display a UI element to distinguish a high calorie food and a low calorie food in the image captured by the internal camera 152. It is possible to simply display calorie text information on each food.

According to an embodiment, acquire user feature information may be acquired including at least one of the user age or gender based on the image based on an image captured by the user by the front camera 151 of the processor 110, control the display 170 to display an augmented-reality object corresponding to the user feature information, and provide a response corresponding to a user input acquired from the user based on the augmented-reality object. That is, a service based on the user profile information may be provided through an augmented-reality object appropriate for the user age or gender.

Figure 33:
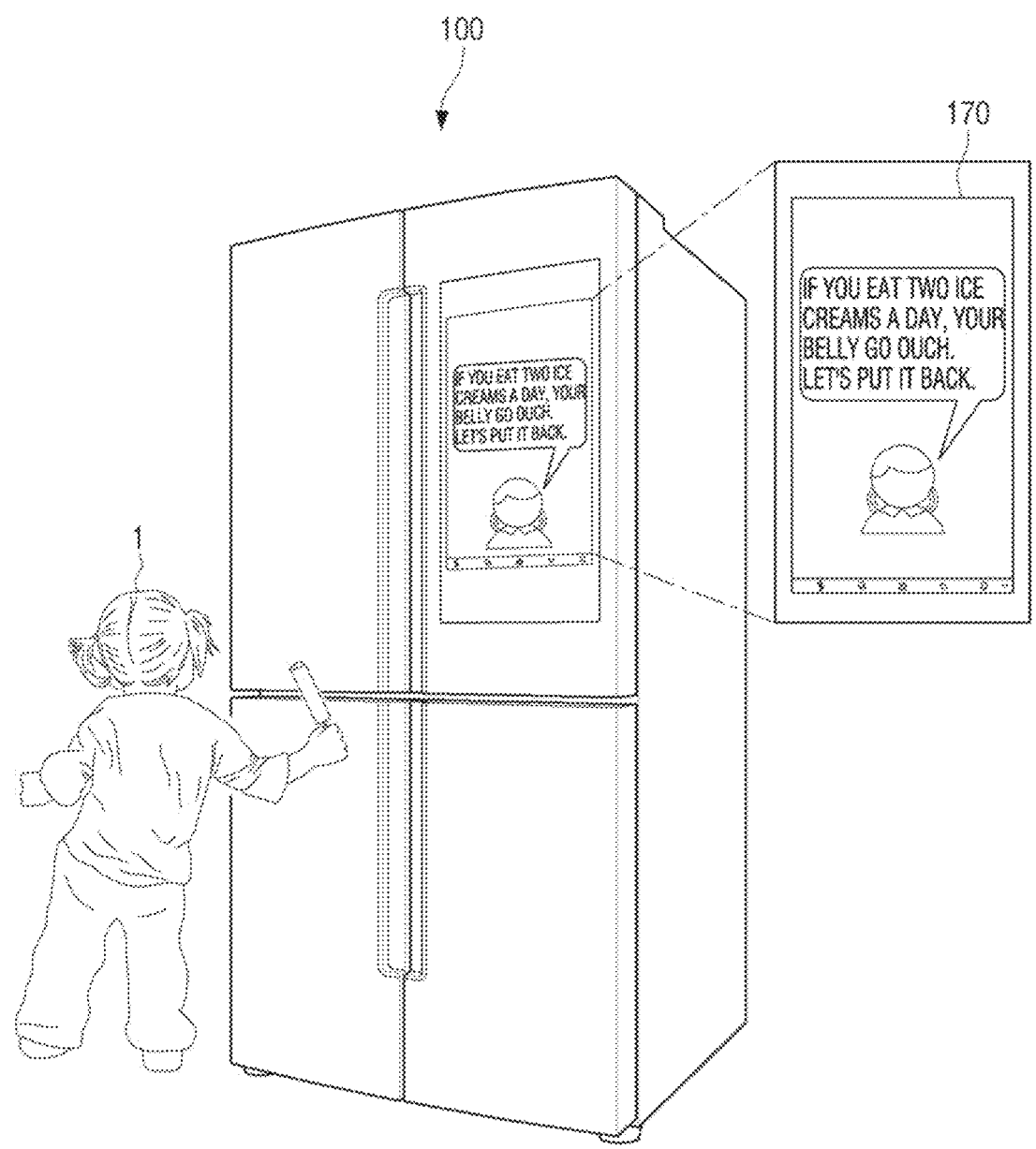
FIG. 33 is a diagram illustrating a refrigerator providing a response service based on feature information and profile information of a user, according to an embodiment of the disclosure.

FIG. 33 is a diagram provided to explain an embodiment in which a service based on user profile information is provided based on an augmented-reality object corresponding to user feature information.

When a user 1 is recognized through fingerprint recognition, voice recognition, face recognition, etc., and it is identified that one ice cream has disappeared based on the pressure sensor 164 of a shelf and an image captured by the internal camera 152, the processor 110 may add an ice cream intake history to profile information of the user 1.

Thereafter, when it is detected that the user 1 has taken out ice cream in the same way again, the processor 110 may identify that the user 1 has cumulatively taken out two ice creams a day. In addition, the processor 110 may perform an operation to persuade the user 1 not to eat ice cream.

For example, referring to FIG. 33, the processor 110 may provide an augmented-reality object on the display based on the user feature information (e.g., age) of the user 1.

In addition, the processor 110 may select a tone and wording for a response based on the user feature information (e.g., age) of the user 1. When the user 1 is a little child, a tone and wording appropriate for kids may be selected to constitute a response.

For example, the processor 110 may output "You eat two ice creams a day, your belly go ouch. Let's put it back." in a speech form through the speaker 130 or in a text form on the display 170. Both may be output simultaneously. While the speech is output through the speaker 130, a mouth shape of the augmented-reality object may move as if the augmented-reality object is saying something.

In response to the above, when the user says "No, I want to", the speech may be acquired in the microphone 140. The processor 110 may provide a response based on the acquired speech. For example, the processor 110 may provide a response of "Then, how about yogurt instead?", and output it through the display and/or the speaker 130.

Thereafter, when the user 1 puts the ice cream back into the refrigerator 100, the processor 110 may identify that one ice cream has been added based on the pressure sensor 164 on the shelf and/or an image captured by the internal camera 152. In addition, the processor 110 may provide a response corresponding thereto. For example, the processor 110 may provide a response of "Good girl, Young-hee.", and output it through the display and/or the speaker 130.

If the user 1 does not put the ice cream back into the refrigerator 100, the processor 110 may transmit a text message informing this matter to a terminal device, for example, smartphone, of parents from among the family members.

According to another embodiment, the refrigerator 100 may provide a recipe appropriate for a cooking skill level of the user included in the user profile information.

The processor 110 may identify the user through face recognition, voice recognition, etc., and based on a cooking skill level included in profile information of the identified user, provide different recipes.

For example, even for the same dish, depending on whether the user is a family member (father or child) who is not skilled in cooking or a family member (mom) who is skilled in cooking, appropriate beginner recipes or advanced recipes may be provided and recommended to the user interactively.

For example, the processor 110 may identify the user based on a speech acquired through the microphone 140, and when a recipe request is included in the speech acquired through the microphone 140 while the augmented-reality object is displayed on the display 170, provide a recipe corresponding to a cooking skill level of the identified user from among a plurality of recipes. For example, a character may introduce the recipe, as illustrated in FIG. 18. However, it is not always necessary to provide a recipe through an augmented-reality object, and it is also possible to provide a recipe without an augmented-reality object.

Thereafter, for example, when provision of the recipe is complete, or the user inputs a command informing completion of cooking via the input interface 175 or utters a speech informing the end of cooking, the processor 110 may identify that the user has finished cooking, and upgrade a cooking skill level within the profile information of the user. For example, when a user voice including information informing completion of cooking as in the provided recipe is acquired through the microphone 140, the cooking skill level of the user may be upgraded. That is, when the cooking skill level of dad is 'low' and dad finishes cooking as in a recipe recommended by the refrigerator 100, the cooking skill level of dad may be upgraded to 'intermediate'. Thereafter, dad may be provided with an advanced recipe according to the upgraded skill level.

As described above, the refrigerator 100 may provide a user-customized interface using an artificial intelligence agent.

Figure 34:
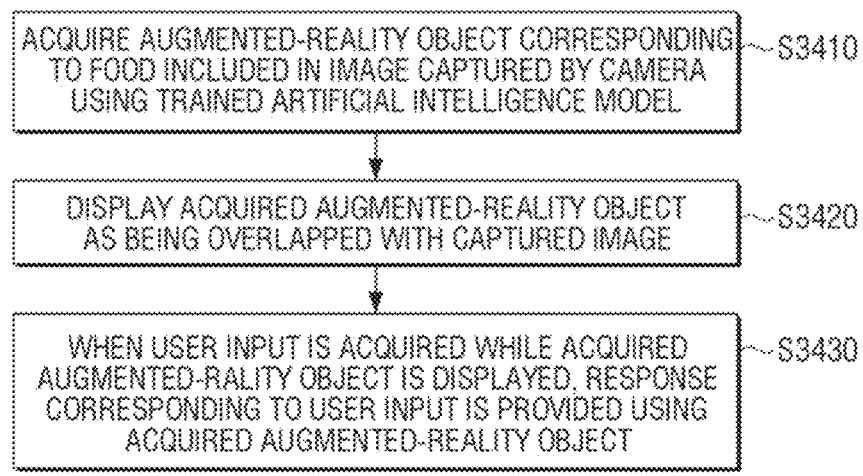
FIG. 34 is a flowchart provided to explain a method of controlling of a refrigerator, according to an embodiment of the disclosure.

FIG. 34 is a flowchart provided to explain a method of controlling of the refrigerator 100, according to an embodiment of the disclosure. The flowchart shown in FIG. 34 may include operations processed in the refrigerator 100 described herein. Accordingly, the detail described above regarding the refrigerator 100 may be, even if omitted hereinbelow, applicable to the flowchart shown in FIG. 34.

A refrigerator of the flowchart of FIG. 34 may include a main body including a storage room, a door coupled to the main body and rotatable in front of one side of the storage room, and including a display on its front surface, and a camera disposed to capture the storage room.

Referring to FIG. 34, the refrigerator may acquire an augmented-reality object corresponding to food included in an image captured by a camera using a trained artificial intelligence model, at operation S3410.

In addition, the refrigerator may overlap the acquired augmented-reality object with the captured image and display them on the display, at operation S3420.

In this case, the refrigerator may display the acquired augmented-reality object as being overlapped with a place where the food is located in the image captured by the camera. For example, the refrigerator may dispose the augmented-reality object in front of the food so that some or all of the food is covered. Accordingly, the user may intuitively identify a corresponding relationship between the augmented-reality object and the actual food. For example, when food is in a black bag, the user may readily identify the food in the black bag through the augmented-reality object.

In addition, when a user input is acquired while the acquired augmented-reality object is displayed, the refrigerator may provide a response corresponding to the user input based on the acquired augmented-reality object, at operation S3430.

According to an embodiment, the refrigerator may include a microphone and a speaker, and when the refrigerator acquires a user voice through the microphone while the acquired augmented-reality object is displayed, display on the display that the acquired augmented-reality object provides a response to the user voice, and output a speech corresponding to the response through the speaker.

According to an embodiment, the refrigerator may, when the user input is related to a recipe request, provide a recipe including the food as ingredients based on the augmented-reality object.

Meanwhile, the refrigerator may provide customized information to the user rather than uniform information. According to an embodiment, information regarding cooking skill level for each user may be stored on the memory of the refrigerator. In addition, the refrigerator may identify the user based on a speech recognized through the microphone. In addition, while the acquired augmented-reality object is displayed, when a recipe request is included in the speech acquired through the microphone, the refrigerator may provide a recipe corresponding to a cooking skill level of the identified user from among a plurality of recipes may be provided based on the augmented-reality object.

In this case, the refrigerator may, when provision of the recipe is complete, or a speech of the user informing completion of cooking as in the provided recipe is acquired through the microphone, upgrade the cooking skill level of the user. That is, a cooking skill level value of the user stored on the memory of the refrigerator may be adjusted upward. Accordingly, when providing recipes thereafter, advanced recipes as compared with the previously-provided recipes may be provided according to the upward-adjusted user cooking skill level.

According to another embodiment of the disclosure, user identification may be performed through a fingerprint sensor provided on the refrigerator. The refrigerator may identify a user who touches a contact surface of the fingerprint sensor.

In addition, the refrigerator may provide food intake history information for each user. According to an embodiment, when a user is identified through the fingerprint sensor of the refrigerator and then, it is identified that a specific food has disappeared from a storage room based on an image captured by a camera disposed to capture the storage room, the refrigerator may add the specific food to food intake information of the user.

It is possible to not only provide a response based on an augmented-reality object, but also deliver information on a state of food through an augmented-reality object. According to an embodiment, the refrigerator may, based on shelf life information of food, change an appearance of the acquired augmented-reality object according to a period for which the food is stored in the refrigerator, and display the augmented-reality object of which the appearance is changed.

According to the embodiments described above, as compared with a related art in which only text-oriented simple information is provided on a display included in a refrigerator, it is possible to provide non-monotonic information more intuitively based on a food-oriented augmented-reality object and a user-customized augmented-reality object (augmented-reality object resembling the user and augmented-reality object appropriate for age and gender of the user). In addition, it is possible to provide different information according to individual characteristics, propensity, habit, etc. instead of uniform information so that functions of the refrigerator may be more effectively used.

In the embodiments described above, an augmented-reality object, information, etc. are provided on the display 170 of the refrigerator 100, but they may also be provided through an external display device. For example, the refrigerator 100 may capture a storage room by using the internal camera 152 and transmit the captured storage room to an external display device such as a user's smartphone or TV, and the external display device may perform an operation of providing an augmented-reality object, displaying an image for which the storage room is captured along with the augmented-reality object, providing a response to a user input, providing information related to food inside the refrigerator 100 (refrigerator stock management information and recipe information), etc. That is, even if a display is not provided on the refrigerator, the embodiments described above may be realized through an external display device.

The various embodiments described above may be implemented as software, hardware, or a combination thereof. According to a hardware implementation, the embodiments described in the disclosure may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions. Particularly, the various embodiments described above may be implemented by the processor 110 of the refrigerator 100. According to a software implementation, embodiments such as the procedures and functions described herein may be implemented with separate software modules. Each of the software modules may perform one or more of the functions and operations described herein.

The embodiments described above may be implemented as a software including instructions that may be stored in machine-readable storage media (for example, computer-readable storage media). The machine is a device which is capable of calling stored instructions from a storage medium and operating according to the called instructions, which may include the refrigerator 100 of the embodiments described herein.

When such an instruction is executed by a processor, the processor may directly, or using other elements under the control of the processor, perform a function corresponding to the instruction. An instruction may include a code which is provided or executed by a compiler or an interpreter. For example, an instruction stored in a storage medium may be executed by the processor so that the method of controlling described above may be thereby executed. For example, an instruction stored in a storage medium may be executed by a processor of a device (or refrigerator), to thereby perform a method of controlling of a refrigerator, the method comprising: acquiring an augmented-reality object corresponding to a food included in an image captured by a camera disposed to capture a storage room using a trained artificial intelligence model; overlapping the acquired augmented-reality object with the captured image, and displaying it on a display provided on a door of a refrigerator; and based on a user input being acquired while the acquired augmented-reality object is displayed, providing a response corresponding to the user input based on the acquired augmented-reality object.

The machine-readable storage media may be provided as non-transitory storage media. Herein, the term "non-transitory" only denotes that a storage medium does not include a signal but is tangible, which does not distinguish a case where data is semi-permanently stored in a storage medium from a case where data is temporarily stored in a storage medium.

According to an embodiment, the method according to the above-described various embodiments may be provided as being included in a computer program product. The computer program product may be traded between a seller and a consumer as a product. The computer program product may be distributed online in the form of machine-readable storage media (e.g., compact disc read only memory (CD-ROM)) or through an application store (e.g., Play Store™ and App Store™). As for online distribution, at least a part of the computer program product may be at least temporarily stored in a server of a manufacturer, a server of an application store, or a storage medium such as memory, or may be temporarily generated.

Each of the components (e.g., module or program) according to the various embodiments may include a single entity or a plurality of entities, and some of the corresponding sub components described above may be omitted, or another sub component may be further added to the various embodiments. Alternatively or additionally, some elements (for example, modules or programs) may be integrated into one entity, and a function performed by the respective elements before integration may be performed in the same or similar manner. The module, a program, or operations executed by other elements according to variety of embodiments may be executed consecutively, in parallel, repeatedly, or heuristically, or at least some operations may be executed according to a different order, may be omitted, or the other operation may be added thereto.

The foregoing embodiments and advantages are merely exemplary and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. A refrigerator, comprising:
a main body including a storage room;
a door coupled to the main body and rotatable in front of a side of the storage room, and including a display on a front surface of the door;
a camera disposed to capture an image of the storage room;
a memory; and
at least one processor,
wherein the at least one processor is configured to display an augmented-reality object capable of performing interaction with a user on the display by:
capturing the image of the storage room of the refrigerator by the camera;
based on at least a request for an augmented reality user interaction received from a first user, identifying a type of an augmented-reality object to be displayed;
based on the identified type of the augmented-reality object to be displayed, acquiring an augmented-reality object corresponding to at least one food included in the image of the storage room from the image using a first learning model, wherein the first learning model is personalized to the first user;
overlapping the acquired augmented-reality object with the captured image of the storage room, and reflecting location information and surface information of a corresponding food within the image; and
providing a response to a user input based on the displayed augmented-reality object.

2. The refrigerator as claimed in claim 1, wherein the first learning model outputs an augmented-reality object in which feature information and food information of an actual captured food is reflected, based on feature information acquired from an identified food image and recognized food information.

3. The refrigerator as claimed in claim 1, further comprising:
a microphone; and
a speaker,
wherein the at least one processor performs interaction with the user on the display by:
based on a user speech while the acquired augmented-reality object is displayed, displaying the acquired augmented-reality object providing a response to the user speech, and controlling the speaker outputting a speech corresponding to the response.

4. The refrigerator as claimed in claim 1, wherein the at least one processor performs interaction with the user on the display by:
based on shelf life information of a food, changing a figure of the acquired augmented-reality object according to a period for which the food is stored in the refrigerator, and outputting the augmented-reality object of which the figure is changed.

5. The refrigerator as claimed in claim 1, wherein the at least one processor performs interaction with the user on the display by:
based on a user input related to a recipe request, acquiring recipe information associated with the recognized in-fridge food information; and
providing the acquired recipe information based on the augmented-reality object, and displaying on the display locations of foods included in the recipe in the refrigerator according to recipe steps, and providing a guide.

6. The refrigerator as claimed in claim 1, further comprising:
a second camera disposed to capture a front side with reference to the front surface of the door,
wherein the at least one processor performs interaction with the user on the display by:
based on an identified second type of the augmented-reality object to be displayed, acquiring user feature information including at least one of an age and gender of the user based on an image for which the user is captured by the second camera, and acquiring a second augmented-reality object corresponding to the user feature information using a second learning model; and
providing a response to a user input acquired from the user based on the second augmented-reality object.

7. The refrigerator as claimed in claim 1, wherein the at least one processor performs interaction with the user on the display by:
based on a user input related to a recipe request, acquiring a plurality of recipe information; and
providing a recipe corresponding to cooking skill level information of a user from among the acquired plurality of recipe information based on the augmented-reality object.

8. The refrigerator as claimed in claim 7, wherein the at least one processor performs interaction with the user on the display by:
upgrading cooking skill level information of the user according to an input of the user informing that cooking is completed as in the provided recipe.

9. The refrigerator as claimed in claim 1, further comprising:
a front camera disposed to capture the front surface of the door; and
a memory configured to store information on an allergic component for each user,
wherein the at least one processor performs interaction with the user on the display by:
based on allergic component information of a recognized user, controlling the display to display a user interface (UI) element to identify a food inducing allergy in the recognized user in an image captured by the camera.

10. The refrigerator as claimed in claim 1, wherein the first learning model is personalized to the first user by training the first learning model based on information related to the first user interacting with the refrigerator.

11. The refrigerator as claimed in claim 1, wherein the first learning model is selected from among a plurality of learning models which are personalized based on a plurality of users.

12. A method for performing a user interaction using an augmented-reality object in a refrigerator comprising a main body including a storage room, a door coupled to the main body and rotatable in front of a side of the storage room, and including a display on a front surface of the door, and a camera disposed to capture an image of the storage room, the method comprising:
using a first learning model trained to provide an augmented-reality object in which a feature of an actual food is reflected based on feature information acquired from an image of a food recognized by image analysis and information on a recognized food, acquiring a first augmented-reality object corresponding to a food included in an image captured by the camera;
using a second learning model trained to provide an augmented-reality object appropriate for a user preference in consideration of an age and gender of a user, acquiring a second augmented-reality object corresponding to user profile information associated with an account of a user of the refrigerator;
overlapping the acquired first or second augmented-reality object with the image of the storage room, and providing an overlapped image;
providing a response to a user input based on the displayed first or second augmented-reality object; and
inputting a performance result of the user with respect to the response to the first learning model or the second learning model, and updating the first augmented-reality object or the second augmented-reality object,
wherein at least one of the first learning model or the second learning model is personalized to the user of the refrigerator.

13. The method as claimed in claim 12, wherein the refrigerator includes a microphone and a speaker, and
wherein the providing the response comprises:
based on a user speech while the acquired first or second augmented-reality object is displayed, displaying the acquired first or second augmented-reality object providing a response to the user speech, and controlling the speaker outputting a speech corresponding to the response.

14. The method as claimed in claim 12, further comprising:
based on shelf life information of a food, changing a figure of the acquired first or second augmented-reality object according to a period for which the food is stored in the refrigerator, and outputting the first or second augmented-reality object of which the figure is changed.

15. The method as claimed in claim 12, wherein the providing the response further comprises:
- based on a user input related to a recipe request, acquiring recipe information associated with the recognized in-fridge food information; and
- providing the acquired recipe information based on the first or second augmented-reality object, and displaying on the display locations of foods included in the recipe in the refrigerator according to recipe steps, and providing a guide.

16. The method as claimed in claim 12, wherein the providing the response comprises:
- based on a user input related to a recipe request, acquiring a plurality of recipe information; and
- providing a recipe corresponding to cooking skill level information of a user from among the acquired plurality of recipe information based on the first or second augmented-reality object.

17. The method as claimed in claim 16, further comprising:
- upgrading cooking skill level information of the user according to an input of the user informing that cooking is completed as in the provided recipe.

18. The method as claimed in claim 12, further comprises:
- based on allergic component information of the recognized user, controlling the display to display a user interface (UI) element to identify a food inducing allergy in the recognized user in an image captured by the camera.

19. A non-transitory storage medium having embodied thereon computer-executable instructions which when executed provide a method of displaying an augmented-reality object capable of performing interaction with a user of a refrigerator, the method comprising:
- using a first learning model trained to provide an augmented-reality object in which a feature of an actual food is reflected based on feature information acquired from an image of a food recognized by image analysis and information on a recognized food, providing a first augmented-reality object corresponding to a food recognized from an image of an inside of the refrigerator;
- identifying information regarding a location area of a food corresponding to the recognized food;
- based on the identified location area information, reflecting location information of a corresponding food within the image of the inside of the refrigerator in the provided first augmented-reality object, overlapping the location information with the provided first augmented-reality object, and displaying the location information and the first augmented-reality object as being overlapped with each other; and
- providing a response to a user input based on the displayed first augmented-reality object, and updating the first learning model based on a result of the response provision,
- wherein the first learning model is personalized to the user.

20. The storage medium as claimed in claim 19, wherein the method further comprises:
- using a second learning model trained to provide an augmented-reality object appropriate for a user preference in consideration of an age and gender of the user, providing a second augmented-reality object corresponding to user profile information associated with an account of the user of the refrigerator.

21. The storage medium as claimed in claim 19, wherein the method further comprises:
- identifying a partially-occluded food from the image of the inside of the refrigerator; and
- providing an image of an occluded area of the identified occluded food as a full food image of a normal food based on a visible partial image.

22. The storage medium as claimed in claim 21, wherein the method further comprises:
- adjusting a transparency of the provided image of the occluded area.

* * * * *